(12) United States Patent
Nagata et al.

(10) Patent No.: US 12,468,912 B2
(45) Date of Patent: Nov. 11, 2025

(54) INSTALLATION SUPPORT DEVICE AND INSTALLATION SUPPORT METHOD FOR STATIONARY CODE READER

(71) Applicant: Keyence Corporation, Osaka (JP)

(72) Inventors: Hidezumi Nagata, Osaka (JP); Taichi Tajika, Osaka (JP); Takashi Hirano, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/971,094

(22) Filed: Dec. 6, 2024

(65) Prior Publication Data

US 2025/0094750 A1    Mar. 20, 2025

Related U.S. Application Data

(63) Continuation of application No. 18/395,870, filed on Dec. 26, 2023, now Pat. No. 12,190,200, which is a
(Continued)

(30) Foreign Application Priority Data

Mar. 19, 2020    (JP) .................. 2020-049506

(51) Int. Cl.
*G06K 7/14*    (2006.01)
*G06K 7/10*    (2006.01)

(52) U.S. Cl.
CPC ....... *G06K 7/1417* (2013.01); *G06K 7/10722* (2013.01); *G06K 7/10831* (2013.01); *G06K 7/1413* (2013.01)

(58) Field of Classification Search
CPC ................ G06K 7/1417; G06K 7/10435
(Continued)

(56) References Cited

U.S. PATENT DOCUMENTS 11,301,659 B2    4/2022    Nagata et al.
11,640,508 B2    5/2023    Nagata et al.
(Continued)

FOREIGN PATENT DOCUMENTS

JP    201264178 A    3/2012
JP    2017094388 A    6/2017
(Continued)

OTHER PUBLICATIONS

U.S. Appl. No. 17/180,895, filed Feb. 22, 2021 (93 pages).
(Continued)

*Primary Examiner* — Toan C Ly
(74) *Attorney, Agent, or Firm* — Kilyk & Bowersox, P.L.L.C.

(57) ABSTRACT

Recommended installation position and posture of a stationary code reader can be proposed to a user to facilitate installation work of the code reader by the user. An installation support device for the stationary code reader acquires camera information including a camera parameter of the code reader, code information to be read, and environment information including a conveying speed of a line, determines required field of view and depth of the code reader required to read a code under an environment specified by the environment information, and determines an installation pattern which is recommended installation position and posture of the code reader that can satisfy the required field of view and depth based on the camera information and the code information.

20 Claims, 28 Drawing Sheets

Related U.S. Application Data continuation of application No. 18/126,501, filed on Mar. 27, 2023, now Pat. No. 11,907,803, which is a continuation of application No. 17/685,414, filed on Mar. 3, 2022, now Pat. No. 11,640,508, which is a continuation of application No. 17/180,899, filed on Feb. 22, 2021, now Pat. No. 11,301,659.

(58) Field of Classification Search
USPC .................................................. 235/462.11
See application file for complete search history.

(56) References Cited

U.S. PATENT DOCUMENTS

| | | |
|---|---|---|
| 11,907,803 B2 | 2/2024 | Nagata et al. |
| 2020/0394812 A1 | 12/2020 | Carey et al. |
| 2021/0295001 A1 | 9/2021 | Nagata et al. |
| 2022/0188533 A1 | 6/2022 | Nagata et al. |
| 2022/0194708 A1 | 6/2022 | Gaggl et al. |
| 2023/0229879 A1 | 7/2023 | Nagata et al. |
| 2024/0176969 A1 | 5/2024 | Nagata et al. |

FOREIGN PATENT DOCUMENTS

| | | |
|---|---|---|
| JP | 2018136860 A | 8/2018 |
| WO | 2020210852 A1 | 10/2020 |
| WO | 2024064924 A1 | 3/2024 |

OTHER PUBLICATIONS

U.S. Appl. No. 17/180,896, filed Feb. 22, 2021 (89 pages).
U.S. Appl. No. 17/180,901, filed Feb. 22, 2021 (83 pages).
Office Action issued in corresponding Japanese Patent Application 2020-049506 issued Oct. 10, 2023 (English translation only)(4 pages).

FIG. 15

| SURFACE | INSTALLATION PATTERN | CONFIGURATION DIAGRAM |
|---|---|---|
| TOP | TOP SURFACE, 15° | 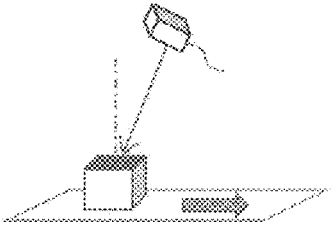 |
| FRONT OR REAR | FRONT SURFACE, 45°<br>REAR SURFACE, 45° | 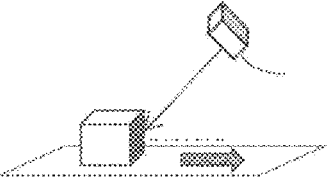 |
| | FRONT SURFACE, 30°<br>REAR SURFACE, 30° | 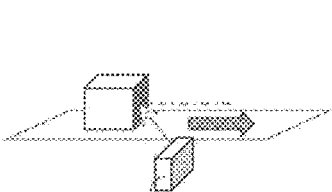 |
| | FRONT SURFACE (SIDE SURFACE INSTALLATION), 45°<br>REAR SURFACE (SIDE SURFACE INSTALLATION), 45°<br>FRONT SURFACE (SIDE SURFACE INSTALLATION), 30°<br>REAR SURFACE (SIDE SURFACE INSTALLATION), 30° | 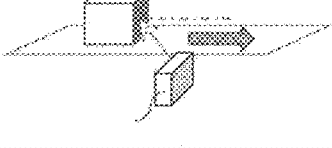 |
| LEFT AND RIGHT | LEFT SURFACE, 15°<br>RIGHT SURFACE, 15° | 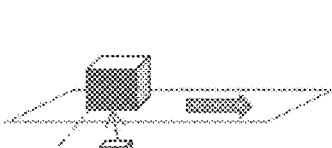 |
| BOTTOM | BOTTOM SURFACE, 15° | 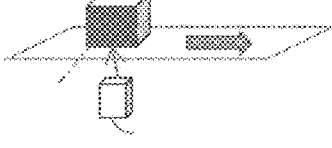 |

FIG. 16
| SURFACE | INSTALLATION PATTERN | CONFIGURATION DIAGRAM | |
|---|---|---|---|
| LEFT AND RIGHT AND FRONT AND REAR | SIDE SURFACE, 4 DIRECTIONS | 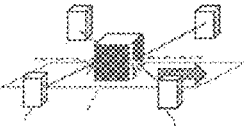 | 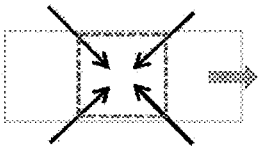 |
| | SIDE SURFACE, 6 DIRECTIONS | 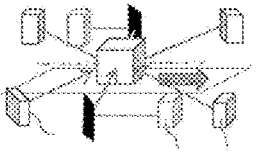 | 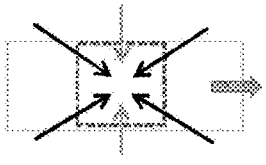 |
| 5 SURFACES | 5 SURFACES, 4 DIRECTIONS | 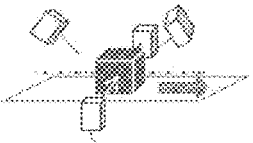 | 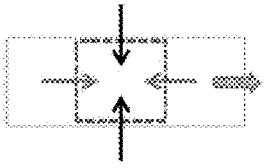 |
| | 5 SURFACES, 6 DIRECTIONS | 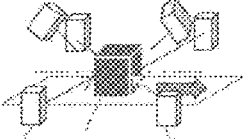 | 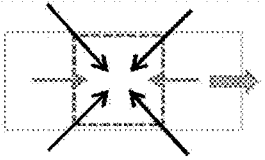 |
| | 5 SURFACES, 7 DIRECTIONS | 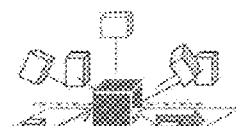 | 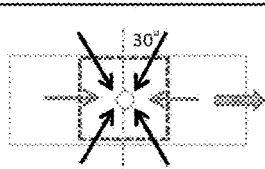 |

FIG. 17
| MOUNTING PATTERN | NO ROTATION OF WORKPIECE | | | |
|---|---|---|---|---|
| | READING OF TOP SURFACE / TOP SURFACE MOUNTING | READING OF FRONT AND REAR SURFACES / TOP SURFACE MOUNTING | READING OF FRONT AND REAR SURFACES / SIDE SURFACE MOUNTING | READING OF LEFT AND RIGHT SURFACES / SIDE SURFACE MOUNTING |
| 0° CRITERION 1 PIECE | 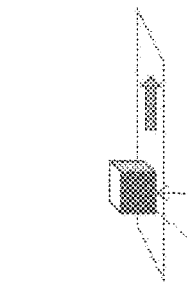 | 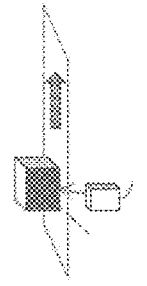 | 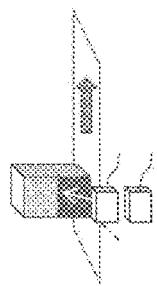 | 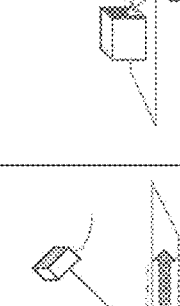 |
| 90° 1 PIECE | 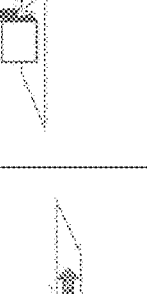 | 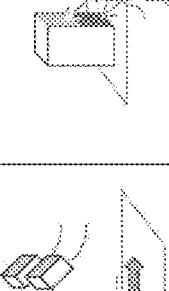 | 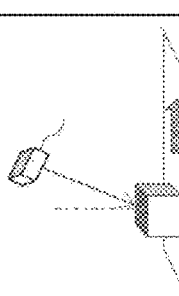 | 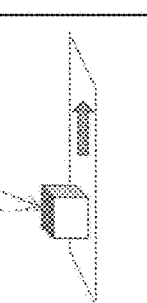 |
| 0° HORIZONTAL × TWO PIECES | 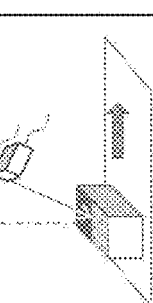 | | | |

FIG. 20

| | Setting Item | Bank 1 | Bank 2 | ... |
|---|---|---|---|---|
| Reading — Common | Bank Name | FOR BAR CODE | FOR 2D CODE | |
| | Decoding Timeout Value | 50ms | 50ms | |
| | Black and White Inversion | VALID | VALID | |
| | Internal Verification | VALID | VALID | |
| | External Lighting | INVALID | INVALID | |
| | Detailed Code Settings | CODE128 | QR | |
| | ... | | | |
| Reading | Exposure Time | 100 μs | 120 μs | |
| | Gain | 15 | 20 | |
| | Contrast Adjustment Scheme | HDR1 | HDR2 | |
| | First Image Filter | LEVELING FILTER | INVALID | |
| | Second Image Filter | INVALID | INVALID | |
| | ... | | | |

401 READING / 402 BANK / 403 COMMUNICATION / 400

FIG. 23

| No | NAME | NUMBER |
|---|---|---|
| | LIST OF DEVICES IN USE | RETURN TO INITIAL VALUES |
| 1 | CODE READER A100 | 1 |
| 2 | TERMINAL BOX | 1 |
| 3 | MOUNTING BRACKET | 1 |
| 4 | POWER SUPPLY CABLE | 1 |
| 5 | CONTROL CABLE | 1 |
| 6 | USB CABLE | 1 |
| 7 | SET OF ALUMINUM FRAME | 1 |

INSTALLATION SUPPORT DEVICE AND INSTALLATION SUPPORT METHOD FOR STATIONARY CODE READER

CROSS-REFERENCE TO RELATED APPLICATIONS

The present application is a continuation of U.S. patent application Ser. No. 18/395,870 filed Dec. 26, 2023, which in turn is a continuation of U.S. patent application Ser. No. 18/126,501 filed Mar. 27, 2023, now U.S. Pat. No. 11,907,803, which in turn is a continuation of U.S. patent application Ser. No. 17/685,414 filed Mar. 3, 2022, now U.S. Pat. No. 11,640,508, which in turn is a continuation of U.S. patent application Ser. No. 17/180,899 filed Feb. 22, 2021, now U.S. Pat. No. 11,301,659, which in turn claims foreign priority based on Japanese Patent Application No. 2020-049506, filed Mar. 19, 2020, the contents of which are incorporated herein by reference.

BACKGROUND OF THE INVENTION

1. Field of the Invention

The present invention relates to an installation support device, an installation support method, and a computer program for a stationary code reader which reads information included in a read image generated by capturing a workpiece.

2. Description of Related Art

In general, a code reader configured to be capable of capturing an image of a code, such as a bar code and a two-dimensional code, attached to a workpiece with a camera, cutting and binarizing the code included in the obtained image by image processing, and reading information by a decoding process (see, for example, Japanese Patent Laid-Open No. 2018-136860 and Japanese Patent Laid-Open No. 2012-64178).

An optical reading device in Japanese Patent Laid-Open No. 2018-136860 is configured to set an upper limit of an exposure time for reading a code based on a moving speed of a workpiece and a cell size constituting the code, and acquire and analyze a plurality of images including the code to automatically set the exposure time within the upper limit.

An optical reading device of Japanese Patent Laid-Open No. 2012-64178 includes a first core that causes an imaging unit to execute imaging processing and transfers acquired image data to a shared memory and a second core that reads the image data from the shared memory and executes a decoding process based on a decoding process request from the first core.

When the device in Japanese Patent Laid-Open No. 2018-136860 can propose not only the upper limit of the exposure time but also the distance from the imaging unit to the code, that is, installation conditions when the conveying speed of a line and the cell size of the code to be read.

However, this device is based on the premise that the workpiece is captured from one side, and the installation conditions can be proposed to the user only for a recommended distance from the imaging unit to the code, and thus, the content as the proposal is sometimes insufficient.

The present invention has been made in view of this point, and an object thereof is to enable proposal of recommended installation position and posture of a stationary code reader to a user to facilitate installation work of the code reader performed by the user.

SUMMARY OF THE INVENTION

In order to achieve the above object, the present disclosure can be premised on the installation support device for the stationary code reader that supports the installation of the stationary code reader that reads a code attached to a workpiece being conveyed on a line. The installation support device including: an acquisition section that acquires camera information including a camera parameter of the code reader, code information to be read, and environment information indicating a reading environment; and a calculation section that determines required field of view and depth of the code reader required to read the code under an environment specified by the environment information based on the environment information acquired by the acquisition section, and determines an installation pattern which is a recommended installation position of the code reader that enables satisfaction of the required field of view and depth based on the camera information and the code information.

The present disclosure also includes an installation support method for a stationary code reader including an acquisition step of realizing the acquisition section and a calculation step of realizing the calculation section.

The present disclosure also includes a computer program that causes the installation support device to execute an acquisition step of realizing the acquisition section and a calculation step of realizing the calculation section.

With this configuration, not only the recommended installation position of the code reader but also the posture of the code reader at the recommended installation position can be determined by the calculation section. As a result, the user can confirm both the position and posture before installing the code reader. In addition, it is sufficient for the user to install the code reader so as to have the determined posture when installing the code reader at the determined recommended installation position, which facilitates the installation work.

According to another embodiment of the invention, an output section that outputs the installation pattern determined by the calculation section is provided, and thus, the recommended installation position and posture of the code reader can be presented to the user.

According to still another embodiment of the invention, the acquisition section can acquire assumed installation position and posture of the code reader, and the calculation section can perform a determination on whether or not a field of view and a depth at the assumed installation position and posture acquired by the acquisition section satisfy the required field of view and depth.

With this configuration, the assumed installation position and posture of the code reader can be acquired by the acquisition section before the recommended installation position and posture of the code reader are determined. The calculation section can determine whether or not the field of view and depth at the acquired assumed installation position and posture satisfy the required field of view and depth, the assumed installation position and posture can be set as the recommended installation position and posture if the required field of view and depth are satisfied. If the required field of view and depth are not satisfied, such non-satisfaction may be presented to the user without setting the assumed installation position and posture as the recommended installation position and posture.

According to still another embodiment of the invention, when the field of view and depth at the assumed installation position and posture acquired by the acquisition section do not satisfy the required field of view and depth, the calculation section executes a change process of changing at least one of the assumed installation position and posture, performs the determination on the assumed installation position and posture after having been subjected to the change process, and repeats the change process and the determination to determine the installation pattern.

With this configuration, if the field of view and depth at the acquired assumed installation position and posture do not satisfy the required field of view and depth, the calculation section executes a change process of changing at least one of the assumed installation position and posture. The determination is performed again based on the assumed installation position and posture after having been subjected to the change process, and the assumed installation position and posture after having been subjected to the change process can be set as the recommended installation position and posture if the required field of view and depth are satisfied. If the required field of view and depth are not satisfied even in the second determination, the change process can be executed again, and the determination can be performed based on the assumed installation position and posture after having been subjected to the change process. By repeating this, the recommended installation position and posture of the code reader can be determined.

According to still another embodiment of the invention, a storage unit that stores a plurality of types of templates indicating types of the assumed installation position and posture of the code reader is provided, and the acquisition section is configured to be capable of acquiring an arbitrary template from among the plurality of types of templates stored in the storage unit.

With this configuration, the plurality of types of templates, which are different in at least one of the assumed installation position and posture, can be created in advance and stored in the storage unit. Since an arbitrary template can be acquired from among the plurality of types of templates stored in the storage unit, the assumed installation position and posture can be easily acquired.

According to still another embodiment of the invention, the template includes mounting angle information of the code reader with respect to a reference surface, and the output section outputs the mounting angle information of the code reader.

With this configuration, it is possible to indicate the mounting angle of the code reader with respect to the reference surface, which is a reference when installing the code reader, and thus, the installation work becomes even easier. The reference surface may be any of, for example, a horizontal plane, a vertical plane, a plane extending in a conveying direction, a plane orthogonal to the conveying direction, a plane on the line, and the like.

According to still another embodiment of the invention, the template includes surface information to be read by the workpiece, and the output section outputs the surface information.

With this configuration, a position and a posture of the code reader that can read a lateral side of the workpiece can be recommended when the code is attached to the lateral side of the workpiece, for example, and a position and a posture of the code reader that can read an upper surface of the workpiece can be recommended when the code is attached to the upper surface of the workpiece. It is possible to make a proposal that is easy for the user to understand by outputting the surface information of the workpiece together with the output of the position and posture of the code reader.

According to still another embodiment of the invention, the output section outputs model information that differs depending on a model of the code reader.

That is, although the field of view and depth differ depending on the model of the code reader, it is possible to present the model of the code reader that satisfies a requirement to the user by outputting the model information of the code reader.

According to still another embodiment of the invention, the acquisition section receives input of information on a width of the line and information on a height of the workpiece as the environment information from a user, and the calculation section calculate and determine the required field of view and depth of the code reader based on a conveying speed of the line, the information on the width of the line, and the information on the height of the workpiece.

Since the required field of view and depth of the code reader are calculated also using the information on the width of the line and the height of the workpiece, it is possible to propose the installation pattern based on an environmental condition close to an actual use site.

According to still another embodiment of the invention, the calculation section determines a plurality of the installation patterns, and the output section outputs the plurality of installation patterns.

Accordingly, the plurality of installation patterns can be presented to the user. When presenting the plurality of installation patterns to the user, the most suitable installation pattern and the other installation patterns may be presented. In addition, for example, the cheapest installation pattern can be presented, or the installation pattern with the smallest number of code readers can be presented.

According to still another embodiment of the invention, a display unit that displays a diagram illustrating the installation pattern is provided, and thus, the diagram illustrating the recommended installation pattern can be displayed on the display unit and presented to the user. As a result, it is for the user to intuitively grasp the installation pattern.

According to still another embodiment of the invention, the output section outputs a component table illustrating component information required to realize the installation pattern and the required number of components, and thus, the user can grasp the components and the number of components for realizing the presented installation pattern.

According to still another embodiment of the invention, the installation pattern can be output as a CAD file. The CAD file may be a two-dimensional CAD file illustrating the installation pattern or a three-dimensional CAD file. Since the CAD file can be provided to the user, the user can directly incorporate the CAD file into a design drawing for use, which is highly convenient.

As described above, according to the present disclosure, the required field of view and depth of the code reader required for reading the code can be determined under the environment specified by the environment information, and the recommended installation position and posture of the code reader, which can satisfy the required field of view and depth can be presented to the user based on the camera information and the code information. Thus, it is possible to facilitate the installation work of the code reader performed by the user.

BRIEF DESCRIPTION OF THE DRAWINGS

FIG. 15 is a table illustrating installation pattern examples when there is one code reader;

FIG. 16 is a table illustrating installation pattern examples when there are a plurality of code readers;

FIG. 17 is a table illustrating an example of a mounting pattern of the code reader;

FIG. 20 illustrates an example of a user interface screen displayed when installation support is performed by the installation support device, and is a view when a bank tab is selected;

FIG. 23 is a view illustrating an example of a list of devices in use;

DETAILED DESCRIPTION OF PREFERRED EMBODIMENTS

Hereinafter, an embodiment of the present aspect will be described in detail with reference to the drawings. Note that the following description of the preferred embodiment is merely an example in essence, and is not intended to limit the present aspect, its application, or its use.

Figure 1:
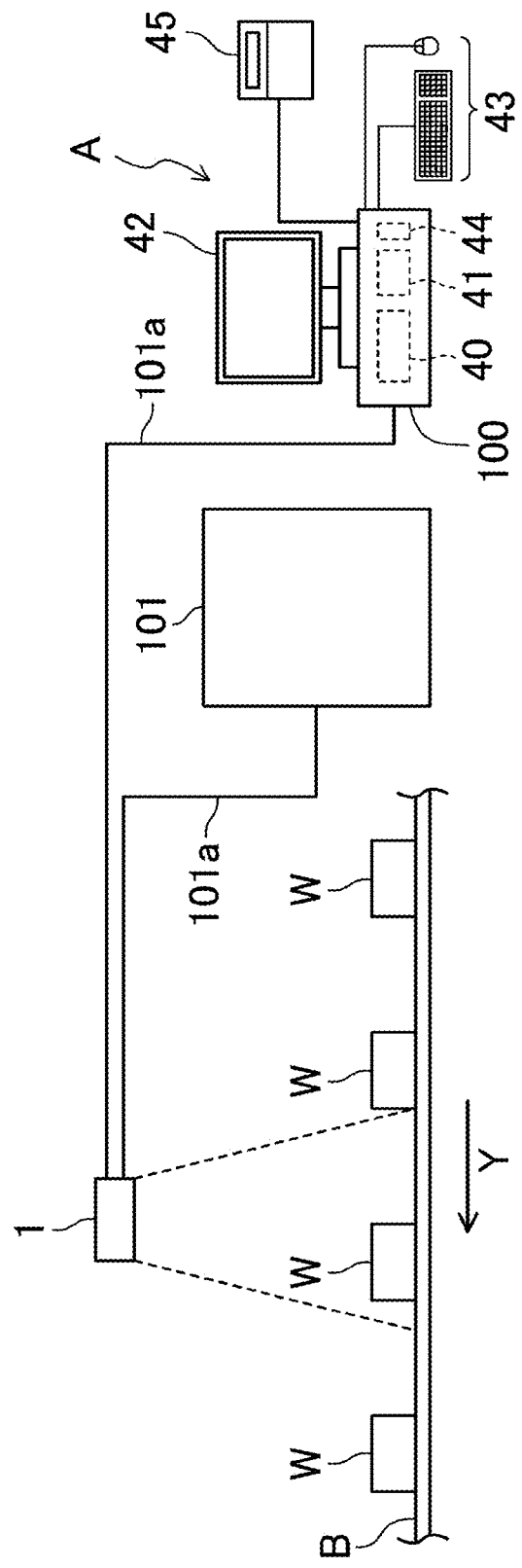
FIG. 1 is a view illustrating the operation time of a stationary code reader according to an embodiment of the present invention.

FIG. 1 is a view schematically illustrating the operation time of a stationary code reader 1 according to an embodiment of the present aspect, and also illustrates a computer 100, a display unit 42, and the like that constitute a part of an installation support device A of the stationary code reader 1.

In the example illustrated in FIG. 1, a plurality of workpieces W are conveyed in a direction of arrow Y in FIG. 1 in the state of being placed on an upper surface of a conveying belt conveyor B, the code reader 1 according to the embodiment is installed at a place separated upward from the workpieces W. The workpiece W sometimes flows not only in the central portion of the upper surface of the conveying belt conveyor B in a width direction but also on one side and the other side in the state of being offset in the width direction, and the workpiece W does not always pass through a fixed position.

The code reader 1 can be used, for example, in a distribution center or the like. Conveyed objects (workpieces W) having various sizes and shapes are conveyed at high speed on the conveying belt conveyor B installed in the distribution center. In addition, an interval between the workpieces W in a conveying direction is also set to be narrow. Further, the workpiece W has a plurality of codes (not illustrated) in some cases, but has only one code in other cases. The code may be a one-dimensional code or a two-dimensional code.

As illustrated in FIG. 1, the code reader 1 is a device that optically reads the code attached to the workpiece W, and is specifically configured to be capable of capturing the code attached to the workpiece W to generate a read image and executing a decoding process of the code included in the generated read image to output a decoding result.

The code reader 1 is used by being fixed to a bracket or the like (not illustrated) so as not to move during its operation, but may be operated while being gripped and moved by a robot (not illustrated) or a user. In addition, the code of the workpiece W in a stationary state may be read by the code reader 1. The operation time is the time during which an operation of reading codes of the workpieces W sequentially conveyed by the conveying belt conveyor B is performed. The code reader 1 of the present embodiment is suitable for a situation where it is desired to read the code attached to the workpiece W whose position varies, but it not limited thereto, and can be also used even in the case of reading the code attached to the workpiece W whose position does not vary.

As illustrated in FIG. 1, the code reader 1 is connected to the computer 100 and a programmable logic controller (PLC) 101 constituting a part of an external control device and a part of an installation support device in a wired manner by signal lines 101a, respectively. However, the aspect is not limited thereto, and the code reader 1, the computer 100, and the PLC 101 may have built-in communication modules to wirelessly connect the code reader 1 with the computer 100 and the PLC 101. The PLC 101 is a control device configured for sequence control of the conveying belt conveyor B and the code reader 1, and can use a general-purpose PLC.

Figure 2:
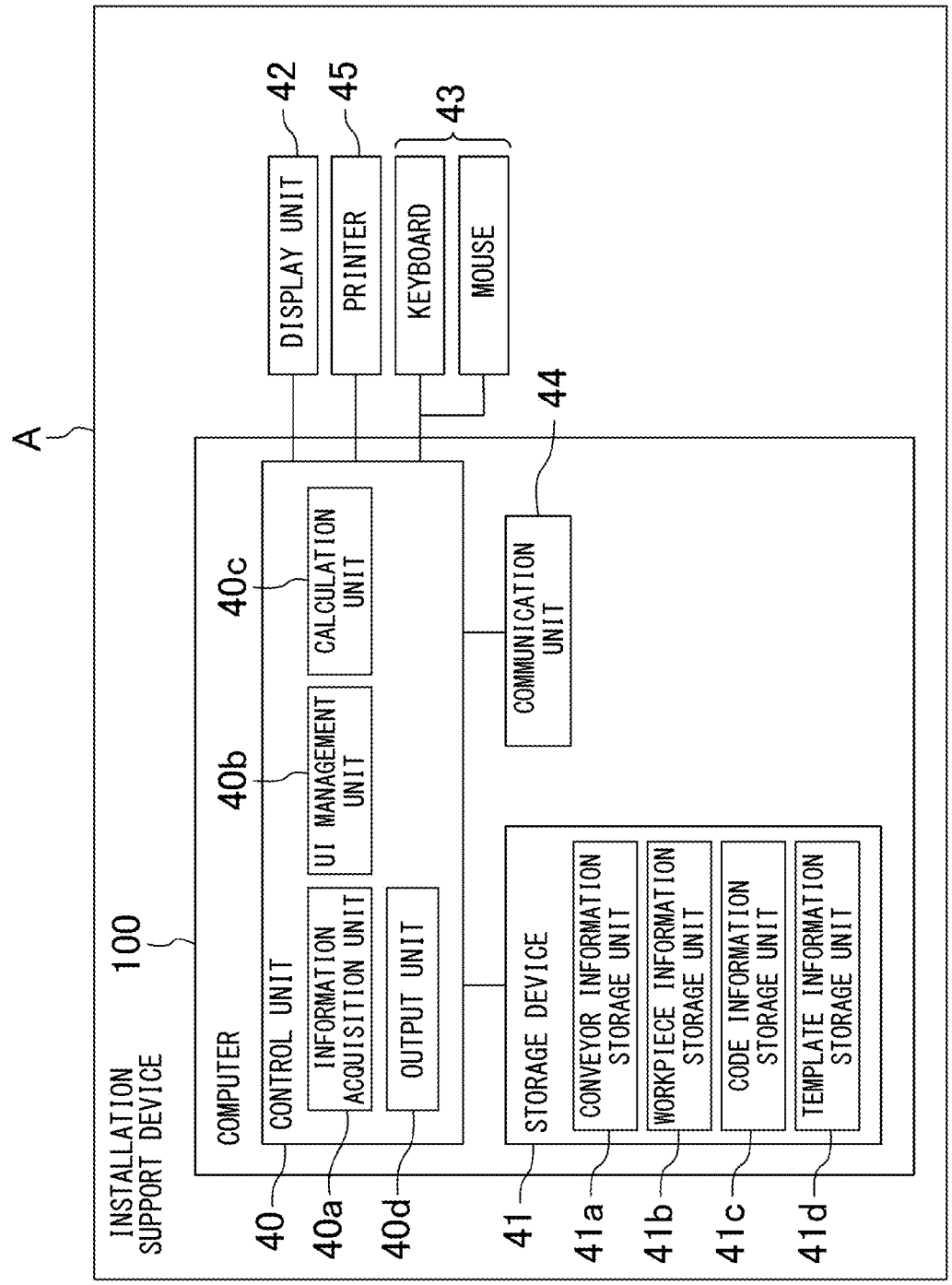
FIG. 2 is a block diagram of an installation support device for the stationary code reader.

The computer 100 can use a general-purpose or dedicated electronic computer, a portable terminal, or the like. In this example, a so-called personal computer is used, and includes a control unit 40, a storage device 41, and a communication unit 44 as illustrated in FIG. 2. As the code reader 1 is downsized, it is difficult to make all the settings of the code reader 1 only with the display unit 7, buttons 8 and 9, and the like (illustrated in FIG. 3) of the code reader 1, and thus, the computer 100 may be prepared separately from the code reader 1, and various settings of the code reader 1 may be made on the computer 100 to transfer setting information to the code reader 1.

In addition, since the computer 100 includes the communication unit 44, the computer 100 and the code reader 1 may be connected to enable bidirectional communication such that a part of processing of the code reader 1 described above is performed by the computer 100. In this case, a part of the computer 100 serves as some components of the code reader 1.

In addition, the code reader 1 receives a reading start trigger signal that defines a code reading start timing from the PLC 101 via the signal line 101a during its operation time Further, the code reader 1 performs imaging and a decoding process of the workpiece W based on the reading start trigger signal. In this manner, during the operation time of the code reader 1, the input of the reading start trigger signal and the output of the decoding result are repeatedly performed via the signal line 101a between the code reader 1 and the external control device such as the PLC 101. Note that the input of the reading start trigger signal and the output of the decoding result may be performed via the signal line 101a between the code reader 1 and the PLC 101 as described above, or may be performed via another signal line (not illustrated). For example, a sensor configured to detect arrival of the workpiece W at a predetermined position and the code reader 1 are directly connected to each other to input the reading start trigger signal from the sensor to the code reader 1.

[Overall Configuration of Code Reader 1]

Figure 4:
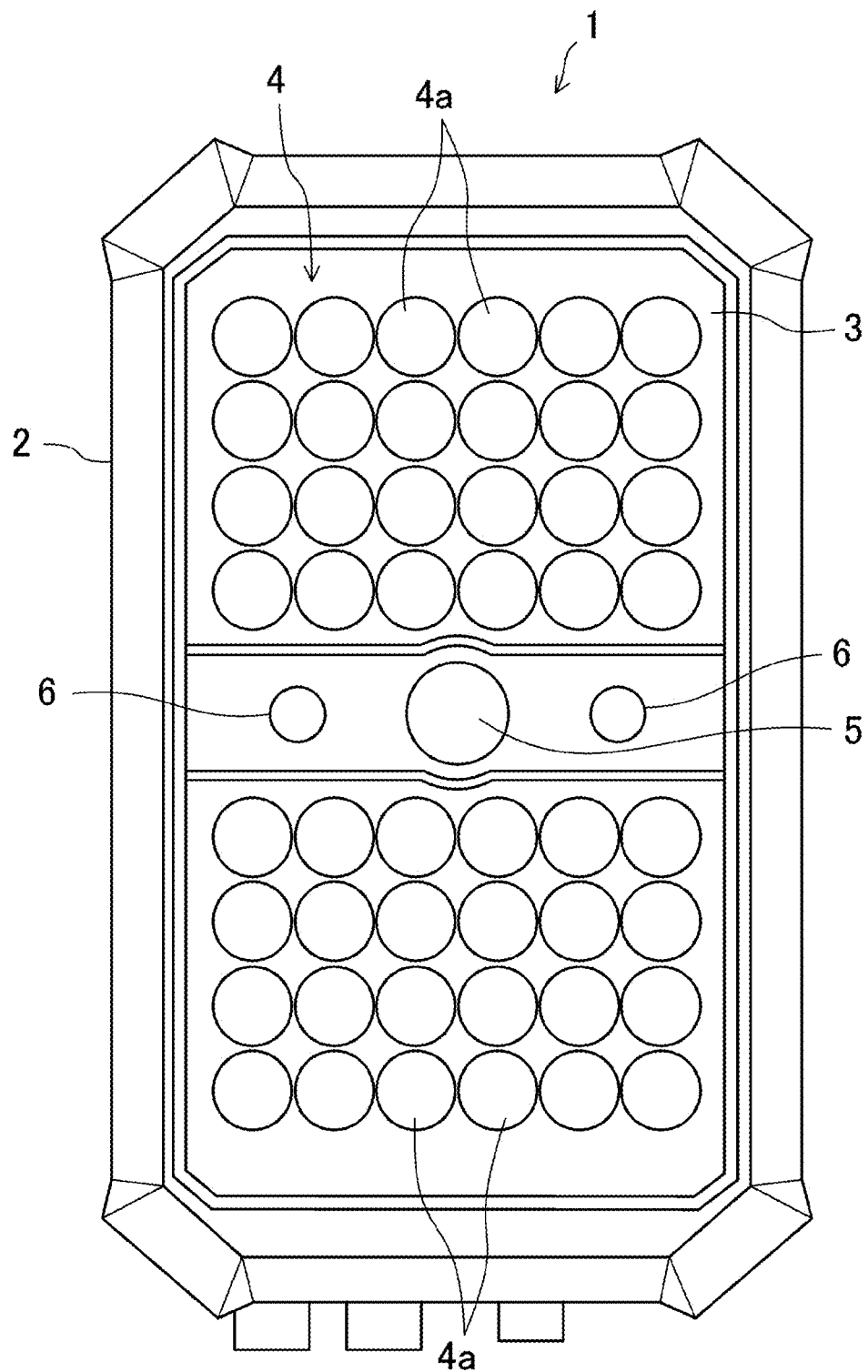
FIG. 4 is a front view of the stationary code reader.
Figure 5:
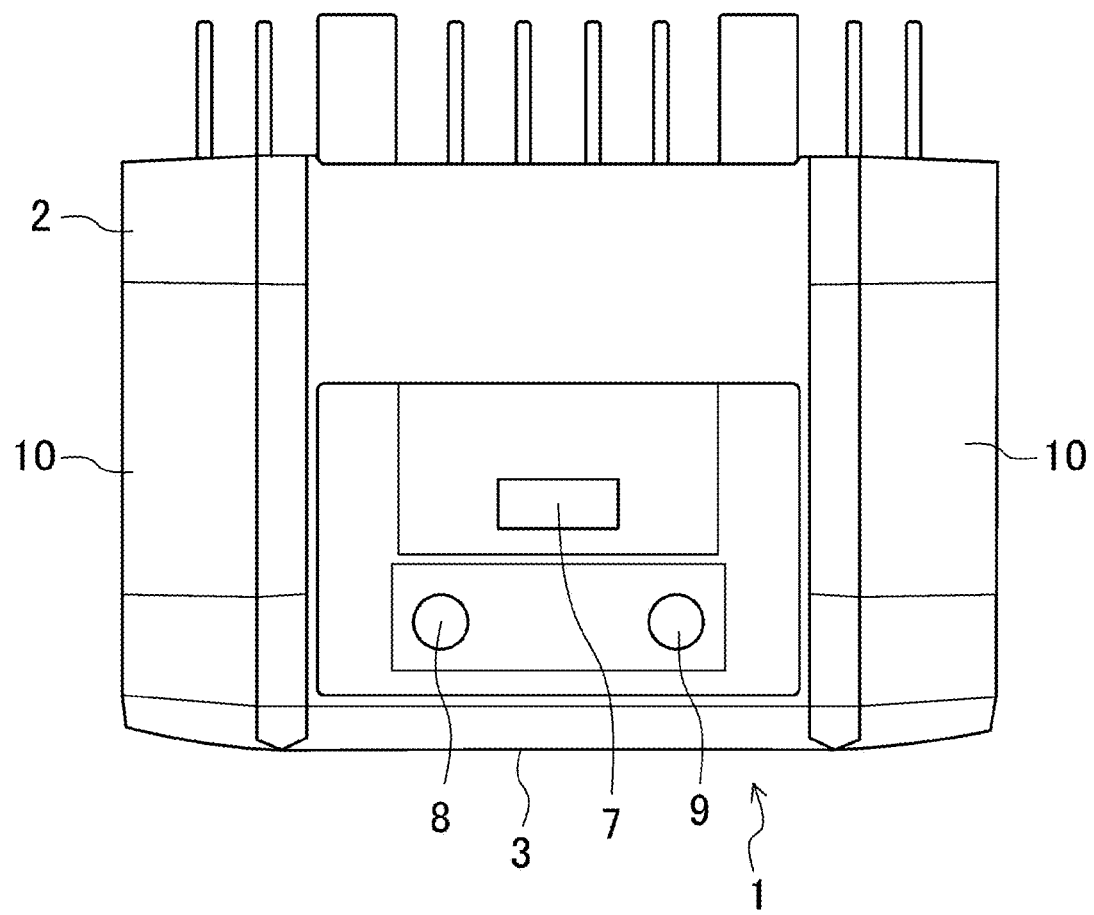
FIG. 5 is a view of the stationary code reader as viewed from an operation button side.
Figure 6:
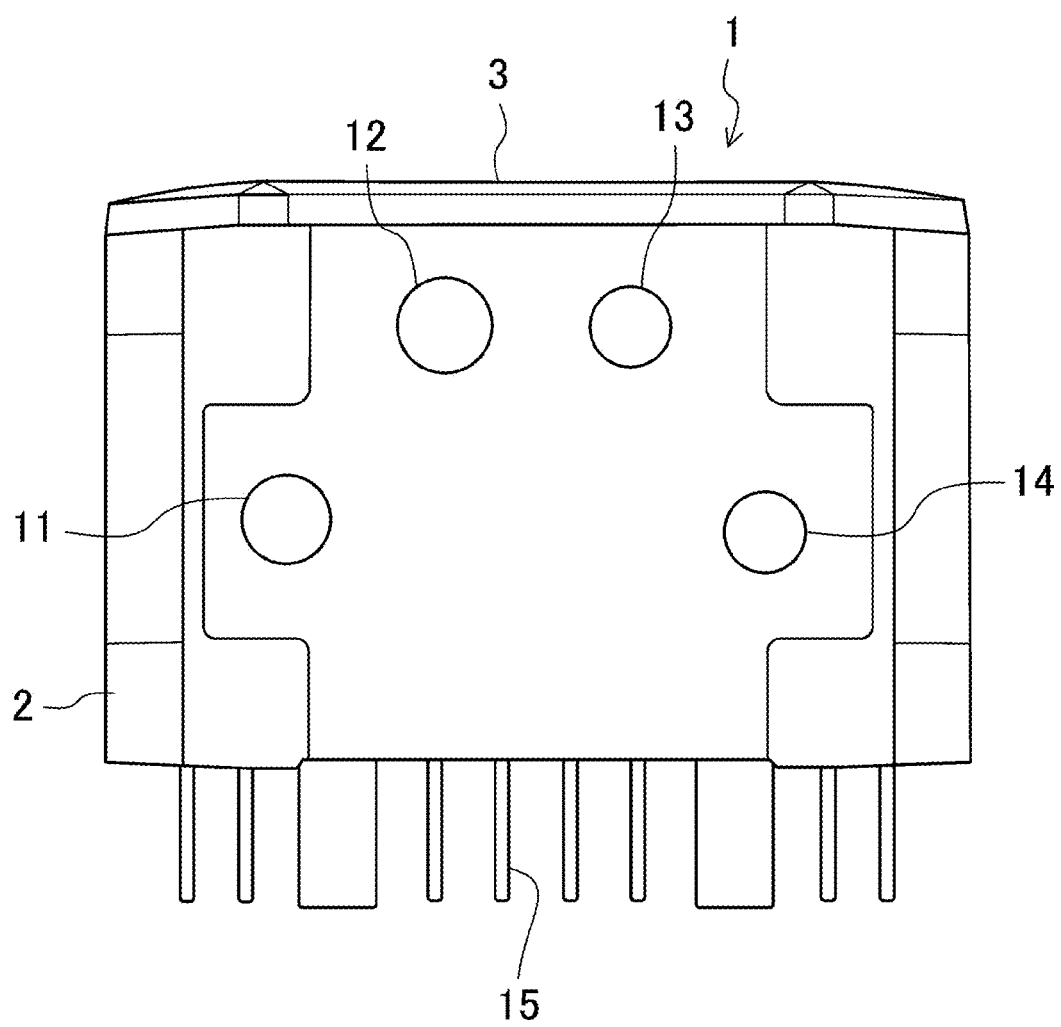
FIG. 6 is a view of the stationary code reader as viewed from a terminal side.

As illustrated in FIGS. 4 to 6, the code reader 1 includes a housing 2 and a front cover 3. Configurations of the illumination unit 4 and the imaging unit 5 will be described later. The aimer 6 is configured using, for example, a light emitting body such as a light emitting diode. The aimer 6 is configured to emit light toward the front of the code reader 1 to indicate an imaging range of the imaging unit 5 and a guideline for an optical axis of the illumination unit 4. A user can also refer to the light emitted from the aimer 6 to install the code reader 1.

In addition, one end surface of the housing 2 is provided with the display unit 7, a select button 8, an enter button 9, and an indicator 10 as illustrated in FIG. 5. A configuration of the display unit 7 will be described later. The select button 8 and the enter button 9 are buttons used for setting or the like of the code reader 1, and are connected to a control section 20. The control section 20 can detect operating states of the select button 8 and the enter button 9. The select button 8 is a button that is operated when selecting one from among a plurality of options displayed on the display unit 7. The enter button 9 is a button that is operated when confirming a result selected by the select button 8. The indicator 10 is connected to the control section 20 and can be configured using a light emitting body such as a light emitting diode. The operating state of the code reader 1 can be notified to the outside by a lighting state of the indicator 10.

In addition, a power connector 11, a network connector 12, a serial connector 13, and a USB connector 14 are provided on the other end surface of the housing 2 as illustrated in FIG. 6. In addition, a heat sink 15 serving as a rear case is provided on a back surface of the housing 2. A power wiring configured to supply power to the code reader 1 is connected to the power connector 11. The serial connector 13 corresponds to the signal lines 100a and 101a connected to the computer 100 and the PLC 101, and the network connector 12 is an Ethernet connector. Note that the Ethernet standard is an example, and signal lines of standards other than the Ethernet standard can be also used.

Figure 3:
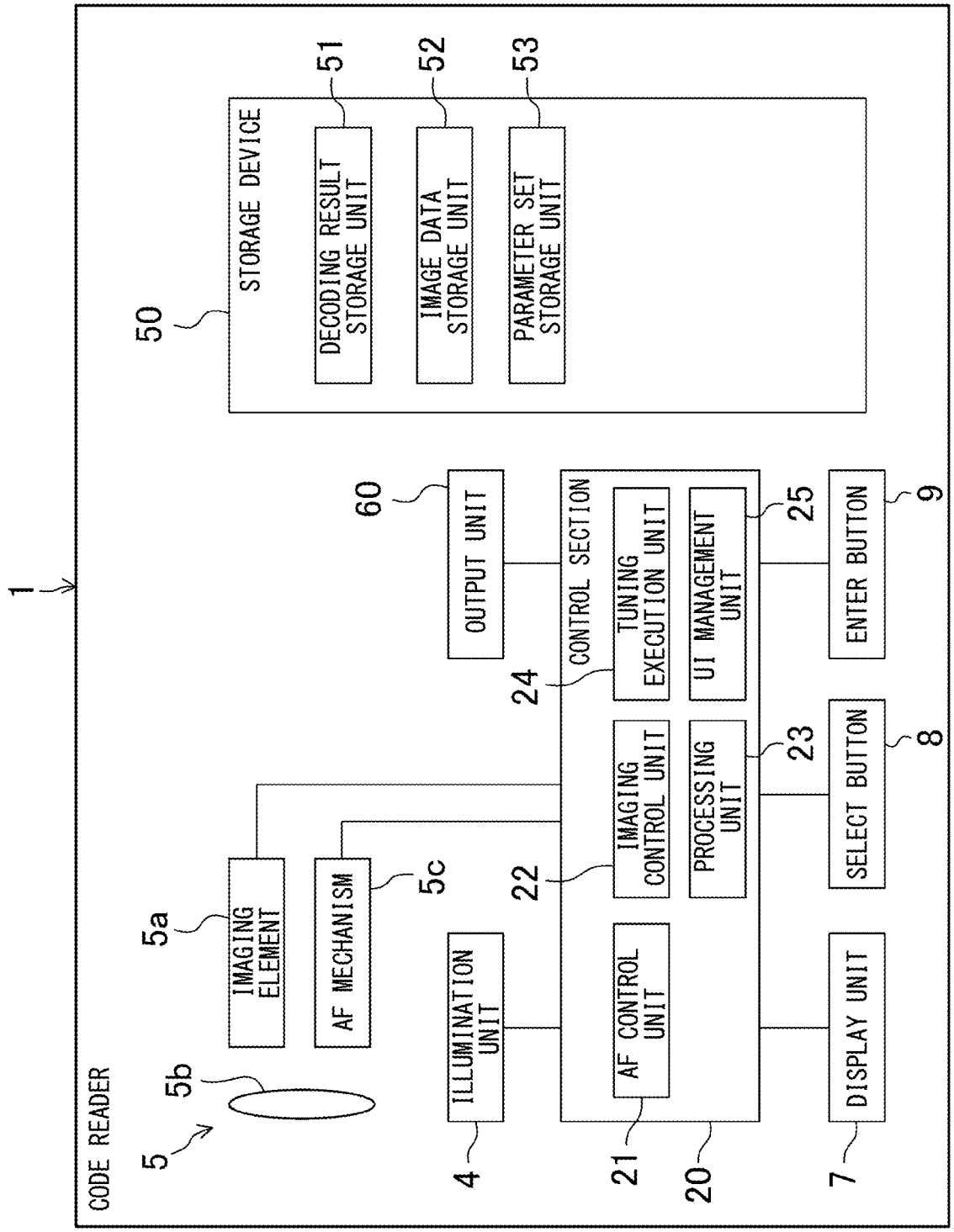
FIG. 3 is a block diagram of the stationary code reader.

Further, the control section 20, a storage device 50, an output unit 60, and the like illustrated in FIG. 3 are provided inside the housing 2. These will be described later.

Although the front surface and the back surface of the code reader 1 are defined as described above in the description of the present embodiment, this is given merely to achieve the convenience of the description, and does not limit the orientation during the operation time of the code reader 1. That is, as illustrated in FIG. 1, the code reader 1 can be installed and used with the front surface directed substantially downward, the code reader 1 can be installed and used with the front surface directed upward, the code reader 1 can be installed and used with the front surface directed downward and inclined, or the code reader 1 can be installed and used with the front surface extending along a vertical plane.

[Configuration of Illumination Unit 4]

As indicated by the broken line in FIG. 1, the illumination unit 4 is a member configured to emit light toward an area through which the workpiece W conveyed by the conveying belt conveyor B passes. The light emitted from the illumination unit 4 illuminates at least a predetermined range in the conveying direction of the conveying belt conveyor B. This predetermined range is a range wider than a dimension in the same direction of the largest workpiece W assumed to be conveyed during the operation time. The illumination unit 4 illuminates the first code CD1 and the second code CD2 attached to the workpiece W conveyed by the conveying belt conveyor B.

The illumination unit 4 includes a light emitting body 4a made of a light emitting diode or the like, for example, and the light emitting body 4a may be one, or a plurality of light emitting bodies 4a may be provided. In this example, the plurality of light emitting bodies 4a are provided, and the imaging unit 5 faces the outside between the light emitting bodies 4a. In addition, the light of the aimer 6 is emitted from a portion between the light emitting bodies 4a. The illumination unit 4 is electrically connected to an imaging control unit 22 of the control section 20 and can be controlled by the control section 20 to be turned on and off at arbitrary timings.

In this example, the illumination unit 4 and the imaging unit 5 are mounted on the single housing 2 to be integrated, but the illumination unit 4 and the imaging unit 5 may be configured as separate bodies. In this case, the illumination unit 4 and the imaging unit 5 can be connected in a wired or wireless manner. In addition, the control section 20, which will be described later, may be built in the illumination unit 4 or the imaging unit 5. The illumination unit 4 mounted on the housing 2 is referred to as an internal lighting, and the illumination unit 4 configured as a separate body from the housing 2 is referred to as an external lighting. It is also possible to illuminate the workpiece W using both the internal lighting and the external lighting.

[Configuration of Imaging Unit 5]

FIG. 3 is a block diagram illustrating the configuration of the code reader 1. The imaging unit 5 is a member configured to receive light emitted from the illumination unit 4 and reflected from an area through which the workpiece W passes, and generate a read image obtained by capturing the image of the area through which the workpiece W passes. As the imaging unit 5, an area camera in which pixels are arrayed vertically and horizontally (X direction and Y direction) can be used. As a result, it is possible to support reading of a two-dimensional code and to capture the images of one workpiece W being conveyed a plurality of times.

As illustrated in FIG. 3, the imaging unit 5 includes: an imaging element 5a that can capture at least a portion of the workpiece W to which the code is attached; an optical system 5b having lenses and the like; and an autofocus mechanism (AF mechanism) 5c. Light reflected from at least the portion of the workpiece W to which the code is attached is incident on the optical system 5b. The imaging element 5a is an image sensor including a light receiving element such as a charge-coupled device (CCD) or a complementary metal oxide semiconductor (CMOS) that converts an image having the code obtained through the optical system 5b into an electrical signal.

The AF mechanism 5c is a mechanism that performs focusing by changing a position and a refractive index of a focusing lens among the lenses constituting the optical system 5b. The AF mechanism 5c is connected to the control section 20 and is controlled by an AF control unit 21 of the control section 20.

The imaging element 5a is connected to the imaging control unit 22 of the control section 20. The imaging element 5a is controlled by the imaging control unit 22 and is configured to be capable of capturing an image of an area through which the workpiece W passes at predetermined fixed time intervals and capturing an image of an area through which the workpiece W passes at arbitrary timings with changed time intervals. The imaging unit 5 is configured to be capable of executing so-called infinite burst imaging in which successive generation of read images is continued. As a result, it is possible to capture the code of the workpiece W moving at high speed into the read image without missing the codes, and it is possible to generate a plurality of read images by capturing the single workpiece W being conveyed a plurality of times. Note that the imaging control unit 22 may be built in the imaging unit 5.

The intensity of light received by a light receiving surface of the imaging element 5a is converted into an electrical signal by the imaging element 5a, and the electrical signal converted by the imaging element 5a is transferred to the processing unit 23 of the control section 20 as image data constituting a read image.

[Configuration of Display Unit 7]

The display unit 7 is configured using, for example, an organic EL display, a liquid crystal display, or the like. The display unit 7 is connected to the control section 20 as illustrated in FIG. 3. On the display unit 7, for example, the code captured by the imaging unit 5, and a character string, a reading success rate, a matching level (reading margin), and the like, which are decoding results of the code, can be displayed. The read success rate is an average read success rate when read processing is executed a plurality of times. The matching level is a reading margin that indicates the ease of reading the code that have been successfully decoded. This can be obtained from the number of error corrections having occurred during decoding, and can be expressed numerically, for example. The matching level (reading margin) increases as the error corrections decrease, and the matching level (reading margin) decreases as the error corrections increase.

[Configuration of Storage Device 50]

The storage device 50 is constituted by various memories, a hard disk, an SSD, and the like. The storage device 35 is provided with a decoding result storage unit 51, an image data storage unit 52, and a parameter set storage unit 53. The decoding result storage unit 51 is a portion that stores a decoding result which is a result obtained by executing a decoding process using the processing unit 23. The image data storage unit 52 is a portion that stores an image captured by the imaging unit 5. The parameter set storage unit 53 is a portion that stores setting information set by the computer 100, setting information set by the select button 8 and the enter button 9, setting information (reading parameters) obtained as a result of executing tuning by a tuning execution unit 24, and the like. The parameter set storage unit 53 can store a plurality of parameter sets including a plurality of parameters constituting imaging conditions (gain, the amount of light of the illumination unit 4, exposure time, and the like) of the imaging unit 5 and image processing conditions (a type of image processing filter and the like) in the processing unit 23.

[Configuration of Output Unit 60]

The code reader 1 includes the output unit 60. The output unit 60 is a portion that outputs a decoding result obtained by a decoding process of the processing unit 23 to be described later. Specifically, when the decoding process is completed, the processing unit 23 transmits the decoding result to the output unit 60. The output unit 60 can be constituted by a communication unit that transmits data related to the decoding result received from the processing unit 23 to, for example, the computer 100 and the PLC 101. The output unit 60 may have an I/O unit connected to the computer 100 and the PLC 101, a serial communication unit such as RS232C, and a network communication unit such as a wireless LAN or a wired LAN.

[Configuration of Control Section 20]

The control section 20 illustrated in FIG. 3 is a section configured to control each part of the code reader 1, and can be configured using a CPU, an MPU, a system LSI, a DSP, dedicated hardware, or the like. The control section 20 is equipped with various functions as will be described later, and these may be implemented by a logic circuit or may be implemented by executing software.

The control section 20 includes the AF control unit 21, the imaging control unit 22, the processing unit 23, the tuning execution unit 24, and a UI management unit 25. The AF control unit 21 is a portion that performs focusing of the optical system 5b by conventionally known contrast AF and phase difference AF. The AF control unit 21 may be included in the imaging unit 5.

[Configuration of Imaging Control Unit 22]

The imaging control unit 22 is a portion that controls not only the imaging unit 5 but also the illumination unit 4. That is, the imaging control unit 22 is configured as a unit that adjusts the gain of the imaging element 5a, controls the amount of light of the illumination unit 4, and controls the exposure time (shutter speed) of the imaging element 5a. The gain, the amount of light of the illumination unit 4, the exposure time, and the like are included in the imaging conditions of the imaging unit 5.

[Configuration of Processing Unit 23]

The processing unit 23 is a portion that extracts a code candidate area from the read image generated by the imaging unit 5, executes a decoding process of the determined area, and generates a decoding result. Since a method for extracting the code candidate area and a method for the decoding process have been conventionally known, the description thereof will be omitted.

[Configuration of Installation Support Device a for Stationary Code Reader]

The installation support device A illustrated in FIG. 1 is a device configured to support the installation of the code reader 1 before installing the code reader 1 in an actual site. A person who uses the code reader 1 (including a prospective user) and a person who proposes the installation of the code reader 1, a person who sells the code reader 1 (collectively referred to as users) can use the installation support device A.

The installation support device A includes the display unit 42, an input unit 43, and a printer 45 in addition to the computer 100, but the printer 45 may be omitted. The display unit 42 is constituted by, for example, a liquid crystal display and the like. The input unit 43 is constituted by a keyboard 43*a*, a mouse 43*b*, a touch sensor (not illustrated), and the like. Although details will be described later, the input unit 43 can input code information to be read and environment information indicating a reading environment. An example of the environment information indicating the reading environment is a conveying speed of a line, but is not limited to the conveying speed of the line. For example, the above environment information may include a distance of the workpiece W moving per unit time and a size of the workpiece W.

As illustrated in FIG. 2, the computer 100 includes the control unit 40, the storage device 41, and the communication unit 44. The control unit 40 is a unit configured to control each part of the installation support device A, and can be configured using a CPU, an MPU, a system LSI, a DSP, dedicated hardware, and the like. The control unit 40 is equipped with various functions as will be described later, and these may be implemented by a logic circuit or may be implemented by executing software. The storage device 41 is constituted by various memories, a hard disk, a solid state drive (SSD), and the like. The communication unit 44 is a portion that communicates with the code reader 1. The communication unit 44 may have an I/O unit connected to the code reader 1, a serial communication unit such as RS232C, and a network communication unit such as a wireless LAN and a wired LAN.

The control unit 40 is a portion that controls each part included in the computer 100 based on a program stored in the storage device 41, and includes an information acquisition unit 40*a*, a UI management unit 40*b*, a calculation unit (an example of a calculation section) 40*c*, and an output unit (an example of an output section) 40*d*. Details of each part will be described later, but the outline is given is as follows. The information acquisition unit 40*a* is an acquisition section that acquires various types of information input by the input unit 43 and various types of information stored in advance in the storage device 41, and is a portion that can acquire at least camera information including a camera parameter of the code reader 1, the code information to be read, and the environment information including the conveying speed of the line. An acquisition step is executed by the information acquisition unit 40*a*.

The UI management unit 40*b* is a portion that generates various user interface screens and receives an input operation of the user using the input unit 43. The calculation unit 40*c* is portion that determines required field of view and depth of the code reader 1 required to read the code under the environment specified by the environment information based on the environment information acquired by the information acquisition unit 40*a*. Further, the calculation unit 40*c* can determine an installation pattern, which is recommended installation position and posture of the code reader 1 that can satisfy the determined required field of view and depth, based on the camera information and the code information acquired by the information acquisition unit 40*a*. A calculation step can be executed by the calculation unit 40*c*. The output unit 40*d* is a portion that outputs the installation pattern determined by the calculation unit 40*c* to the display unit 42 via the user interface screen or outputs the installation pattern to the printer 45 in a report format.

Hereinafter, the processing flow of the installation support device A will be described with reference to the flowchart illustrated in FIG. 7. In Step SA1, the information acquisition unit 40*a* acquires camera parameters. The camera parameter is information of the imaging unit 5 provided in the code reader 1, that is, information included in the camera information. The information acquisition unit 40*a* may read the camera parameter directly from the code reader 1, or the camera parameter may be stored in the storage device 41 in advance and the camera parameter may be read and acquired from the storage device 41. In addition, the information acquisition unit 40*a* may acquire the camera parameter input by the input unit 43. The camera parameters include the number of pixels of the imaging element 5*a* and an angle of view and aperture of the optical system 5*b*, but may include another information unique to the imaging unit 5. The camera parameters are fixed values determined for each imaging unit 5, and thus, are not changeable by the user.

As the code reader 1, a plurality of models having different imaging units 5 and illumination units 4 are prepared, and each of the models can be used. Since the camera parameter and the like differ depending on the model of the code reader 1, the information acquisition unit 40*a* acquires the camera parameter of each of the models. The camera parameter, a model type, and the like are model information of the code reader 1.

In Step SA2, the information acquisition unit 40*a* acquires the code information. The code information is information for identifying a type of code to be read. The code information includes a code type such as a one-dimensional code and a two-dimensional code, an NB width (narrow bar width), a maximum code length, and the like. The code information is information input by the user by operating the input unit 43. In addition, the code information may be acquired by capturing the code to be read.

In Step SA3, the information acquisition unit 40*a* acquires workpiece information and conveyor information. The workpiece information and the conveyor information are information input by the user by operating the input unit 43. The workpiece information includes a size of a minimum workpiece W and a size of a maximum workpiece W conveyed by the conveying belt conveyor B, a minimum interval between the workpieces W conveyed by the conveying belt conveyor B, a surface of the workpiece W to which the code is attached, a position of the code on the workpiece W, a position of the workpiece W on the conveying belt conveyor B, and the like.

The size of the workpiece W can be specified by the width, depth, and height of the workpiece W. The minimum size and maximum size of the workpiece W can be used as reference values for the required field of view and depth. The information on the position of the code with respect to the workpiece W may be input when the position of the code is limited, and the required field of view and depth can be mitigated by acquiring this information. The minimum interval between the workpieces W is an interval until the next workpiece W arrives, and is a value that relates to the calculation of the reading timing and the required field of view. The position information of the workpiece W on the conveying belt conveyor B is information indicating, for example, whether the workpiece W is located at the center in the width direction on the conveyor or displaced to one side in the width direction, and the required field of view and depth can be mitigated by acquiring this information. In other words, an area through which the code passes can be narrowed down by the workpiece information, and the required field of view and depth can be calculated by inputting the workpiece information.

In addition, the conveyor information includes a height, a width, a conveying speed, a length, and the like of a conveyance surface of the conveying belt conveyor B. The height of the conveyance surface can be used to calculate an installation distance of the code reader 1. The width of the conveyance surface can be used to calculate the required field of view. The conveying speed can be used to calculate the number of times the code reader 1 can be read. The length of the conveyance surface can be used as a reference value in a vertical field of view. In other words, the conveyor information can be used to calculate the required field of view and the installation distance of the code reader 1.

In addition, a required field of view in a conveyor movement direction can be calculated using the conveying speed of the line, but the required field of view in the conveyor movement direction can be also calculated using the distance of the workpiece W moving per unit time and the size of the workpiece W as well as the conveying speed of the line. That is, it suffices to use dimensional information regarding the direction in which the workpiece W moves as an input value.

Figure 8:
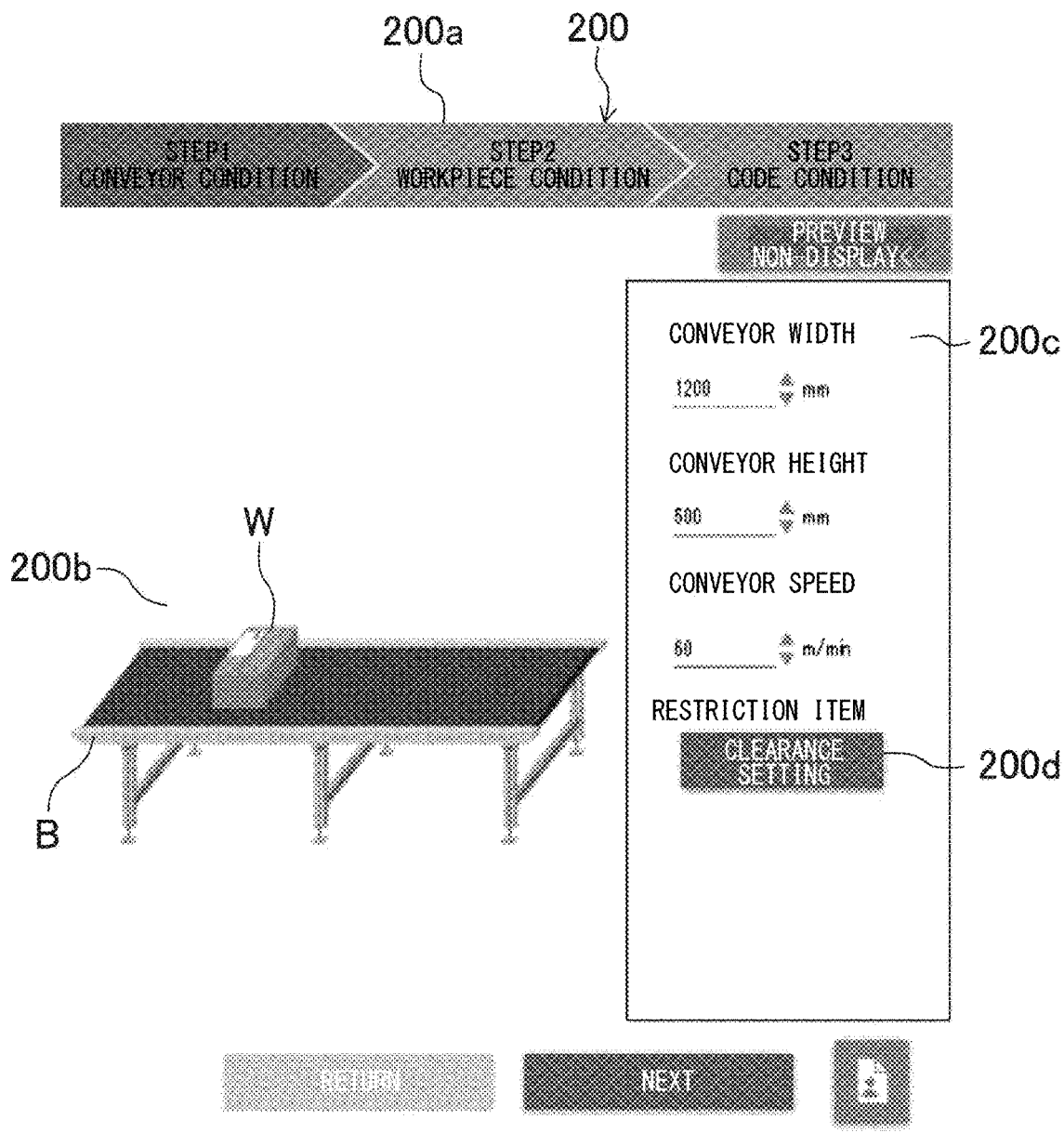
FIG. 8 is a view illustrating an example of a user interface screen for input of conveyor information.

Next, an example of a procedure for input of the workpiece information and the conveyor information will be described. FIG. 8 is a view illustrating an example of a user interface screen 200 for input of conveyor information displayed in Step SA3. The UI management unit 40b generates the user interface screen 200 for input of conveyor information and displays the user interface screen 200 for input of conveyor information on the display unit 42. The user interface screen 200 for input of conveyor information is provided with a progress status display area 200a, an image display area 200b, a conveyor information input area 200c, and a clearance setting start button 200d. In the progress status display area 200a, three steps of an input step of conveyor information (conveyor condition), an input step of workpiece information (workpiece condition), and an input step of code information (code condition) are displayed side by side in the input order. In the image display area 200b, the workpiece W in the state of being conveyed by the conveying belt conveyor B is illustrated.

Whenever each piece of information included in the conveyor information and the workpiece information is input, the conveyor and the workpiece can be redrawn and displayed on each user interface screen. As a result, the user can virtually grasp a situation at the site in a visual manner.

In the conveyor information input area 200c, input can be performed for three items of the width of the conveyance surface of the conveying belt conveyor B (conveyor width), the height of the conveyance surface of the conveying belt conveyor B (conveyor height), and the conveying speed of the conveying belt conveyor B (conveyor speed). An input operation for each item can be performed by the input unit 43. An input value is stored in a conveyor information storage unit 41a provided in the storage device 41.

Figure 9:
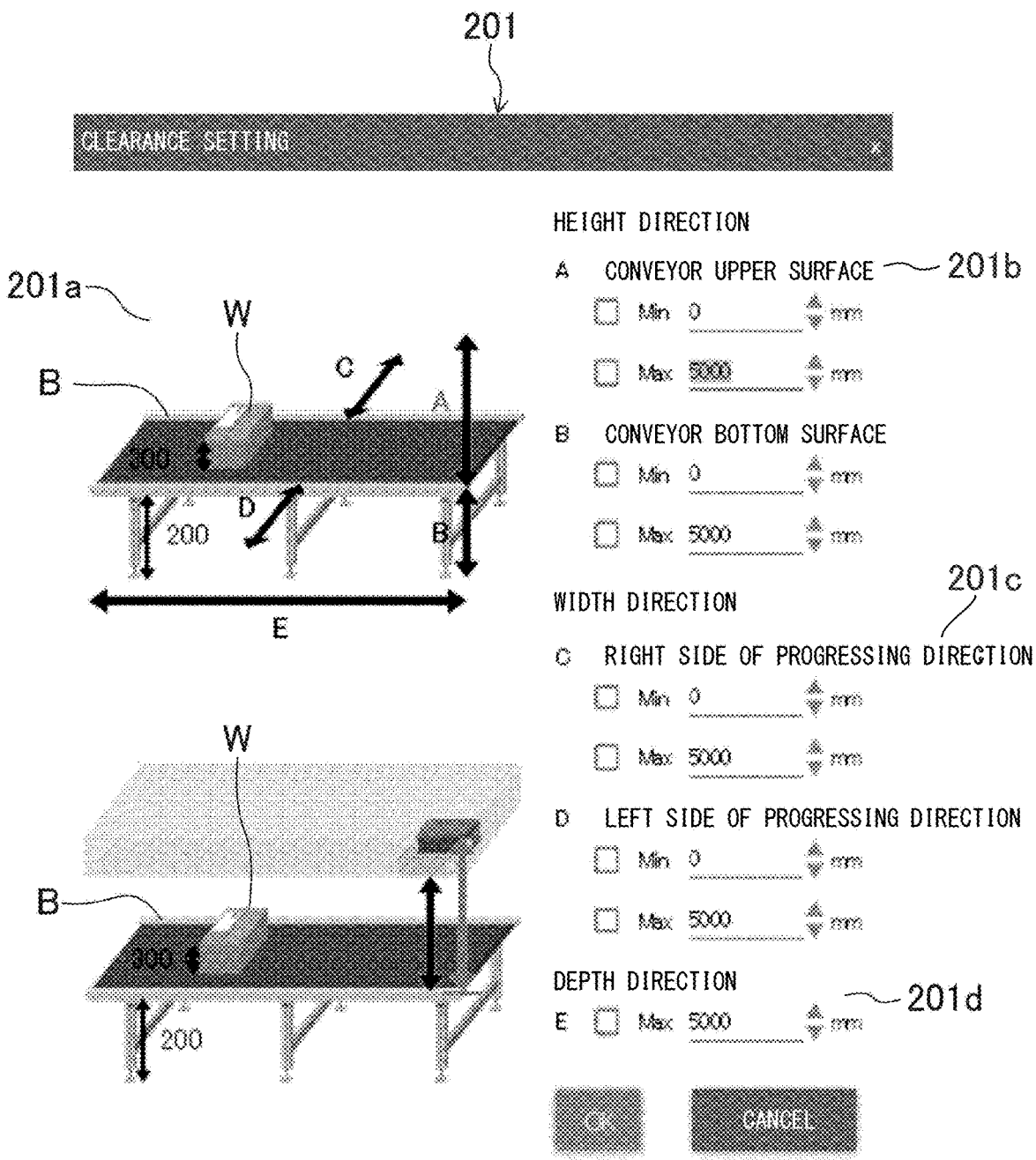
FIG. 9 is a view illustrating an example of a user interface screen for clearance installation.

When detecting that the clearance setting start button 200d has been operated, the UI management unit 40b generates a user interface screen 201 for clearance setting illustrated in FIG. 9 and displays the user interface screen 201 for clearance setting on the display unit 42. The user interface screen 201 for clearance setting is provided with an image display area 201a, a height direction clearance setting area 201b, a width direction clearance setting area 201c, and a depth direction clearance setting area 201d. In the image display area 201a, clearances set in clearance setting areas 201b, 201c, and 201d are illustrated by arrows together with the workpiece W in the state of being conveyed by the conveying belt conveyor B. In the height direction clearance setting area 201b, clearances above and below the conveyor can be set. In the width direction clearance setting area 201c, clearances on the right side and the left side in a progressing direction of the workpiece W can be set. In the depth direction clearance setting area 201d, a clearance in the conveying direction of the conveying belt conveyor B can be set. An input operation for each item can be performed by the input unit 43. When an "OK" button on the user interface screen 201 for clearance setting is operated, the input value is stored in the conveyor information storage unit 41a, and the screen returns to the user interface screen 200 for input of conveyor information illustrated in FIG. 8. When a "Cancel" button on the user interface screen 201 for clearance setting illustrated in FIG. 9 is operated, the input value is not stored, and the screen returns to the user interface screen 200 for input of conveyor information illustrated in FIG. 8.

Figure 10:
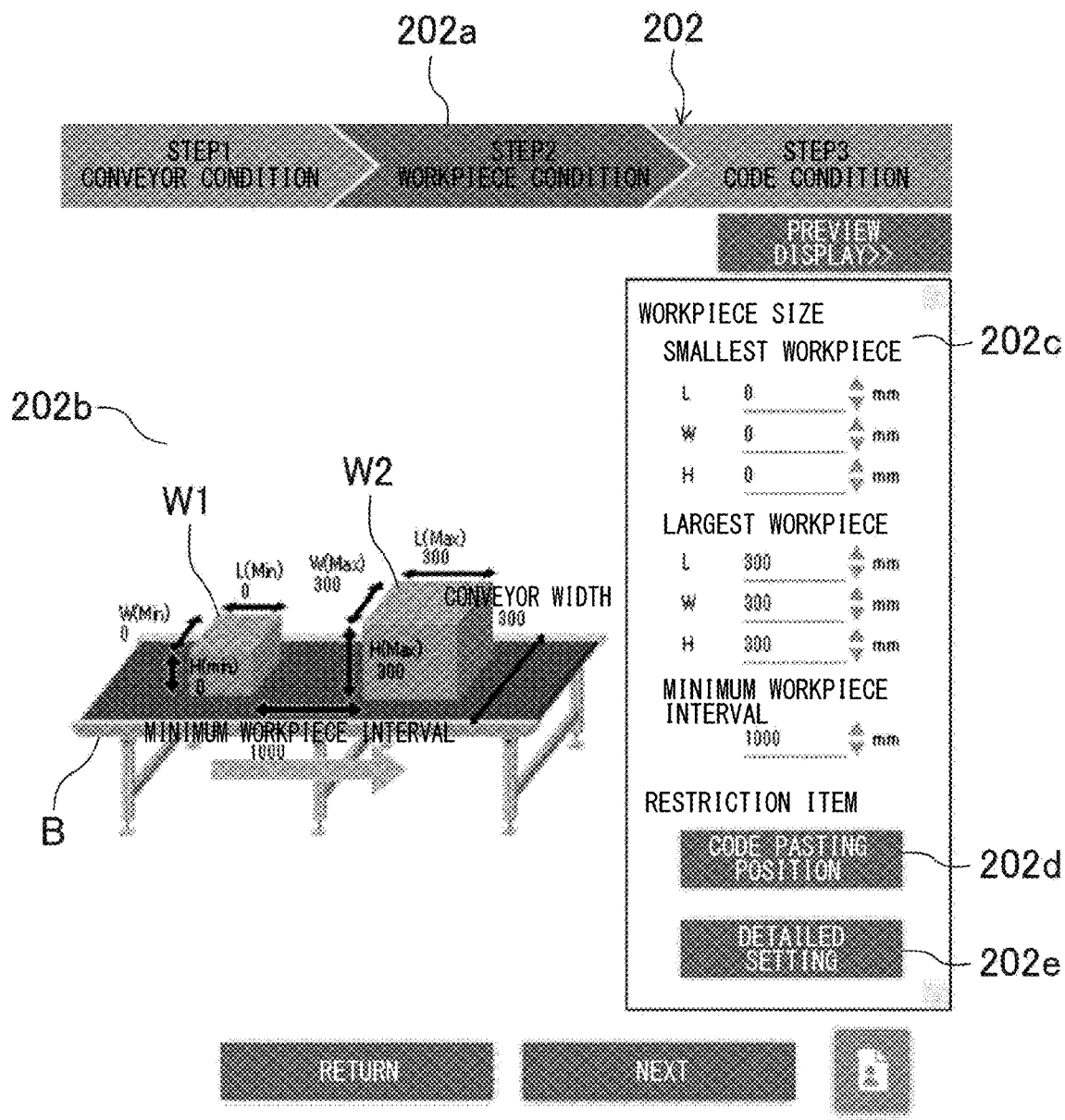
FIG. 10 is a view illustrating an example of a user interface screen for input of workpiece information.

When detecting the operation of a "Next" button on the user interface screen 200 for input of conveyor information illustrated in FIG. 8, the UI management unit 40b generates a user interface screen 202 for input of workpiece information illustrated in FIG. 10 and displays the user interface screen 202 for input of workpiece information on the display unit 42. The user interface screen 202 for input of workpiece information is also displayed in Step SA3. The user interface screen 202 for input of workpiece information is also provided with a progress status display area 202a and an image display area 202b. Further, the user interface screen 202 for input of workpiece information is provided with a workpiece information input area 202c for input of workpiece information, a code pasting position setting start button 202d, and a detailed setting start button 202e.

In the workpiece information input area 202c, each of a size of a minimum workpiece W1 and a size of a maximum workpiece W2 conveyed by the conveying belt conveyor B, and the minimum interval between the workpieces W conveyed by the conveying belt conveyor B can be input by the input unit 43. When detecting the operation of the code pasting position setting start button 202d, the UI management unit 40b generates a user interface screen 203 for code pasting illustrated in FIG. 11 and displays the user interface screen 203 for code pasting on the display unit 42. The user interface screen 203 for code pasting is provided with an image display area 203a, a pasting surface specifying area 203b, and a pasting position specifying area 203c. In the pasting surface specifying area 203b, any surface of the workpiece W to which the code is attached can be specified by the input unit 43. For example, the surface can be specified by the user's selection from among a plurality of selection branches such as a top surface and left and right surfaces. Information on this surface is surface information to be read in the workpiece W. In the pasting position specifying area 203c, any location on the surface specified in the pasting surface specifying area 203b where the code exists can be specified by dimensions. In the case of the workpiece W for which it is difficult to specify a pasting position, no input may be performed. In the image display area 203a, the surface specified in the pasting surface specifying area 203b and each dimension input in the pasting position specifying area 203c can be illustrated.

Figure 11:
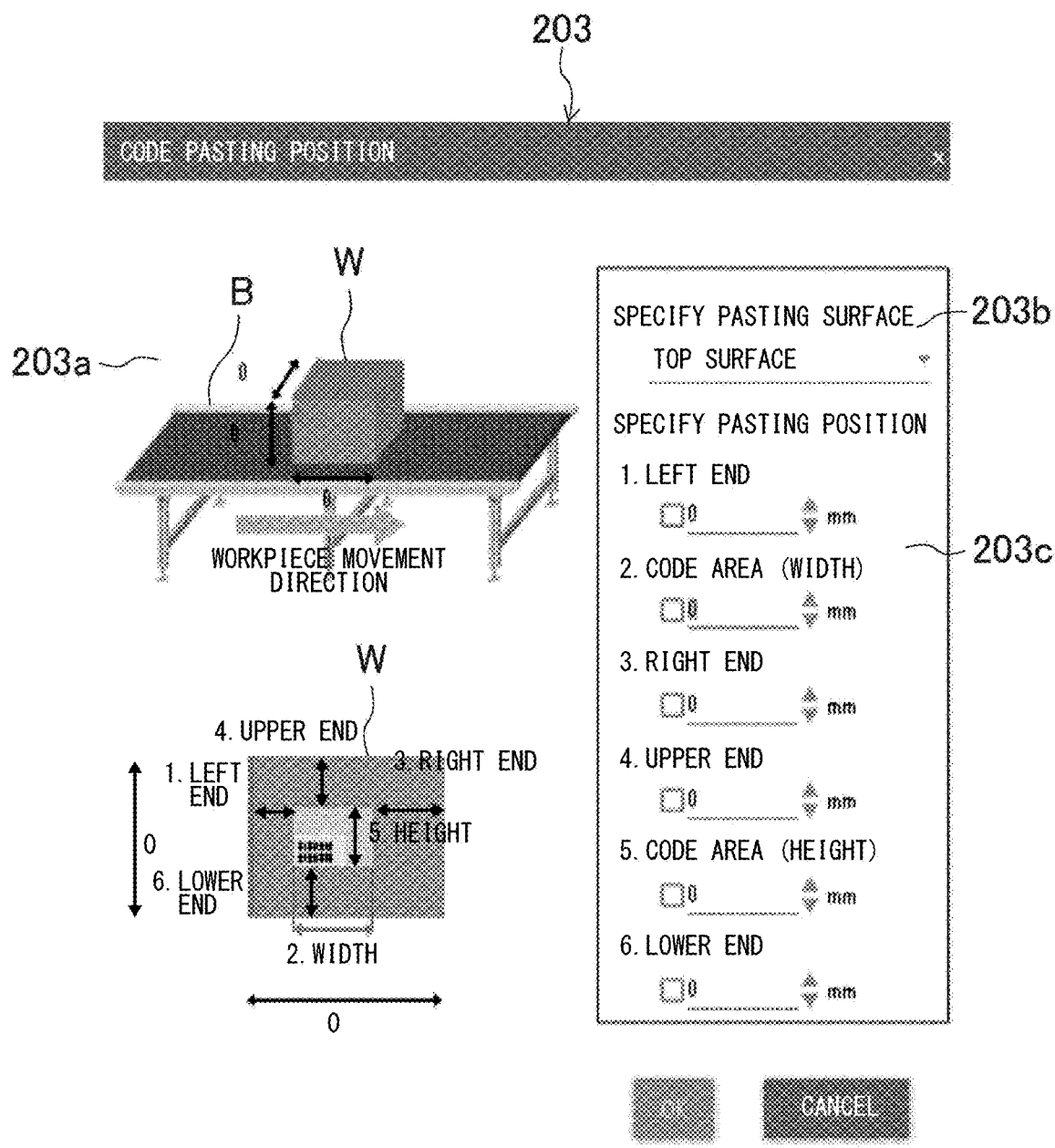
FIG. 11 is a view illustrating an example of a user interface screen for setting of a code pasting position.

When an "OK" button on the user interface screen 203 for code pasting is operated, the input value is stored in a workpiece information storage unit 41b provided in the storage device 41, and the screen returns to the user interface screen 202 for input of workpiece information illustrated in FIG. 10. When a "Cancel" button on the user interface screen 203 for code pasting illustrated in FIG. 11 is operated, the input value is not stored, and the screen returns to the user interface screen 202 for input of workpiece information illustrated in FIG. 10.

Figure 12:
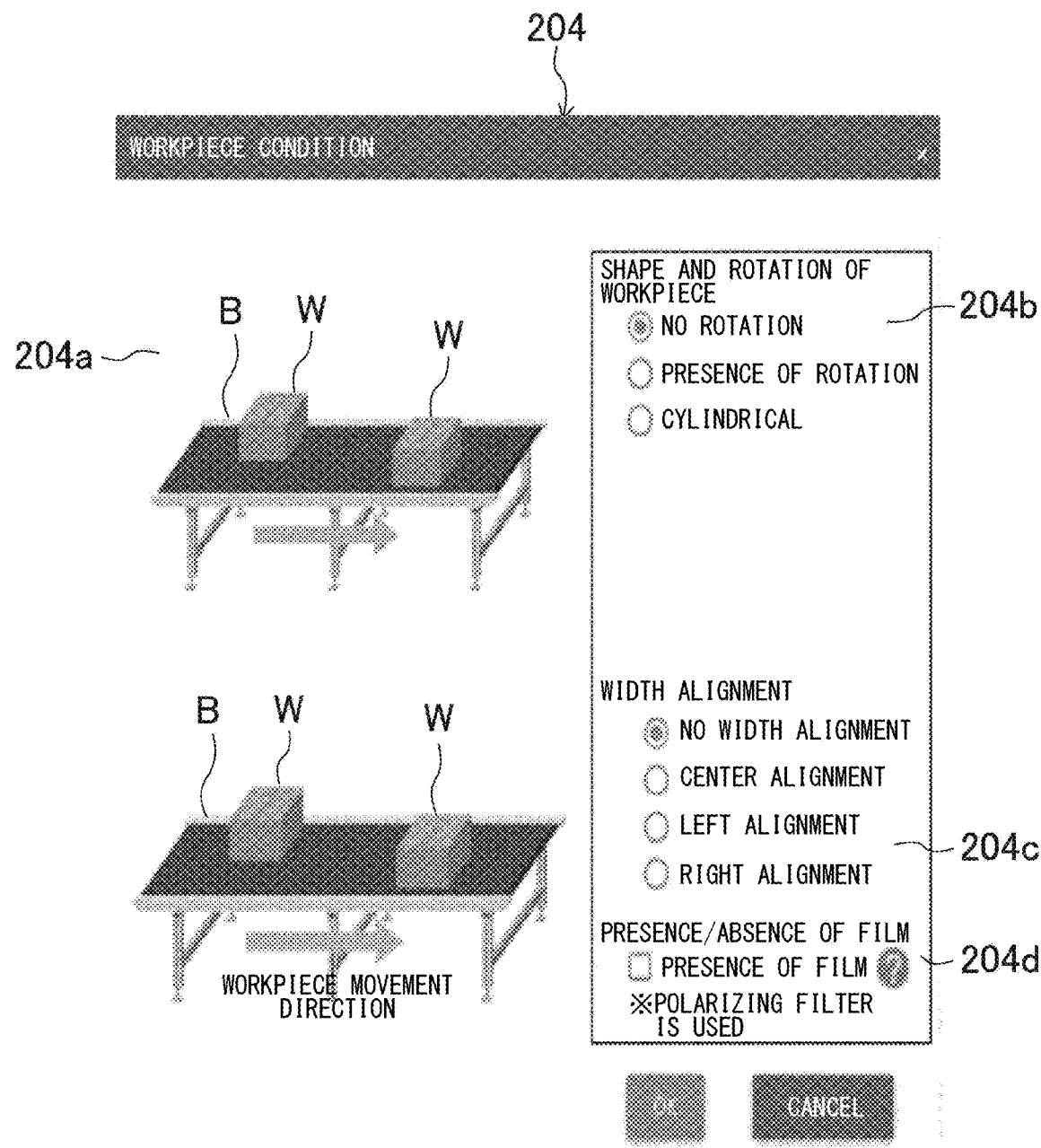
FIG. 12 is a view illustrating an example of a user interface screen for detailed setting.

When detecting the operation of a detailed setting button 202e illustrated in FIG. 10, the UI management unit 40b generates a user interface screen 204 for detailed setting illustrated in FIG. 12 and displays the user interface screen 204 for detailed setting on the display unit 42. The user interface screen 204 for detailed setting is provided with an image display area 204a, a workpiece shape and rotation specifying area 204b, a width alignment specifying area 204c, and a film presence/absence specifying area 204d. In the workpiece shape and rotation specifying area 204b, the input unit 43 can specify whether or not the workpiece W sometimes rotates and whether or not the workpiece W is cylindrical. In the width alignment specifying area 204c, the input unit 43 can specify whether or not the workpiece W is cylindrical. In the film presence/absence specifying area 204d, the input unit 43 can specify whether or not there is a film on the surface of the workpiece W.

When an "OK" button on the user interface screen 204 for detailed setting is operated, the input value is stored in a workpiece information storage unit 41b provided in the storage device 41, and the screen returns to the user interface screen 202 for input of workpiece information illustrated in FIG. 10. When a "Cancel" button on the user interface screen 204 for detailed setting illustrated in FIG. 12 is operated, the input value is not stored, and the screen returns to the user interface screen 202 for input of workpiece information illustrated in FIG. 10.

Figure 13:
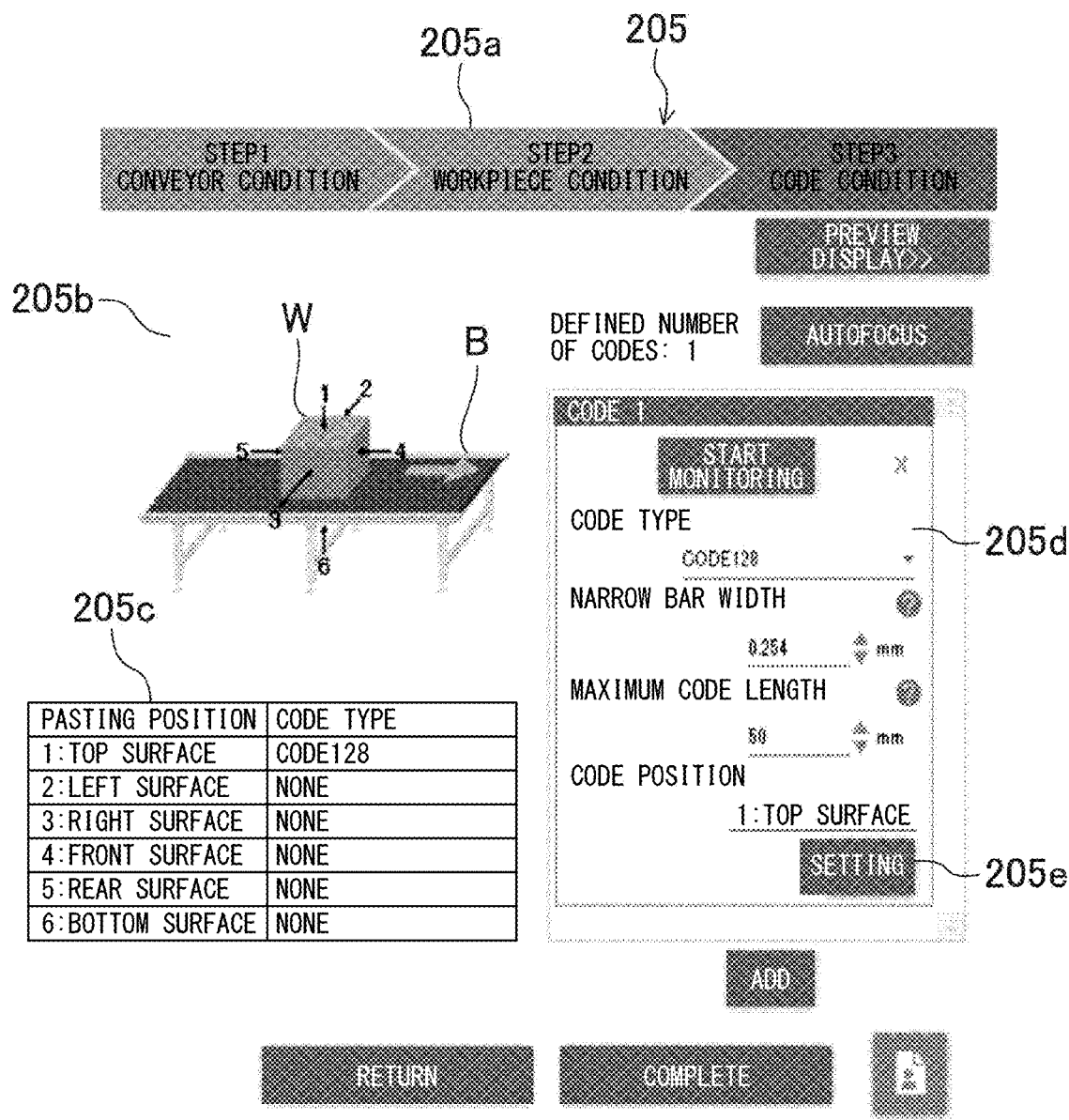
FIG. 13 is a view illustrating an example of a user interface screen for input of code information.

When detecting the operation of a "Next" button on the user interface screen 202 for input of workpiece information illustrated in FIG. 10, the UI management unit 40b generates a user interface screen 205 for input of code information illustrated in FIG. 13 and displays the user interface screen 205 for input of code information on the display unit 42. The user interface screen 205 for input of code information is displayed in Step SA2 of the flowchart illustrated in FIG. 7. The user interface screen 205 for input of code information is also provided with a progress status display area 205a and an image display area 205b. Further, the user interface screen 205 for input of code information is provided with a code position and type display field 205c displaying a code pasting position and a code type and a code information input area 205d. In the code information input area 205d, a code type, an NB width, a maximum code length, and the like can be input by operating the input unit 43.

Figure 14:
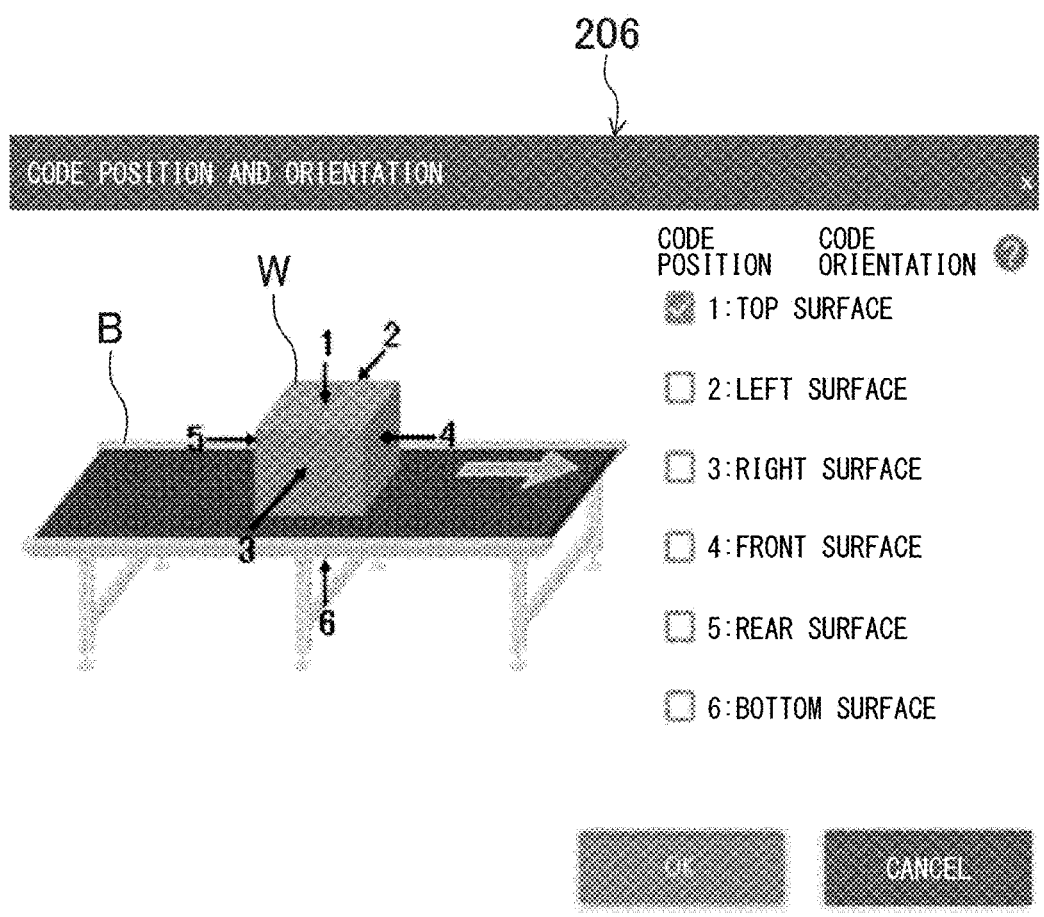
FIG. 14 is a view illustrating an example of a user interface screen for input of code position and orientation.

The code information input area 205d is provided with a setting button 205e. When detecting the operation of the setting button 205e, the UI management unit 40b generates a user interface screen 206 for input of code position and orientation illustrated in FIG. 14 and displays the user interface screen 206 for input of code position and orientation on the display unit 42. On the user interface screen 206 for input of code position and orientation, a code position can be input by operating the input unit 43 from among a top surface, a side surface, a front surface, a rear surface, a bottom surface, and the like of the workpiece W. When an "OK" button on the user interface screen 206 for input of code position and orientation is operated, the input value is stored in a code information storage unit 41c provided in the storage device 41, and the screen returns to the user interface screen 205 for input of code information illustrated in FIG. 13. When a "Cancel" button on the user interface screen 206 for input of code position and orientation illustrated in FIG. 14 is operated, the input value is not stored, and the screen returns to the user interface screen 205 for input of code information illustrated in FIG. 13. Examples of the input operation performed by the user in Steps SA2 and SA3 of the flowchart illustrated in FIG. 7 have been described as above, but the input order, screen display forms, and the like can be changed.

Figure 7:
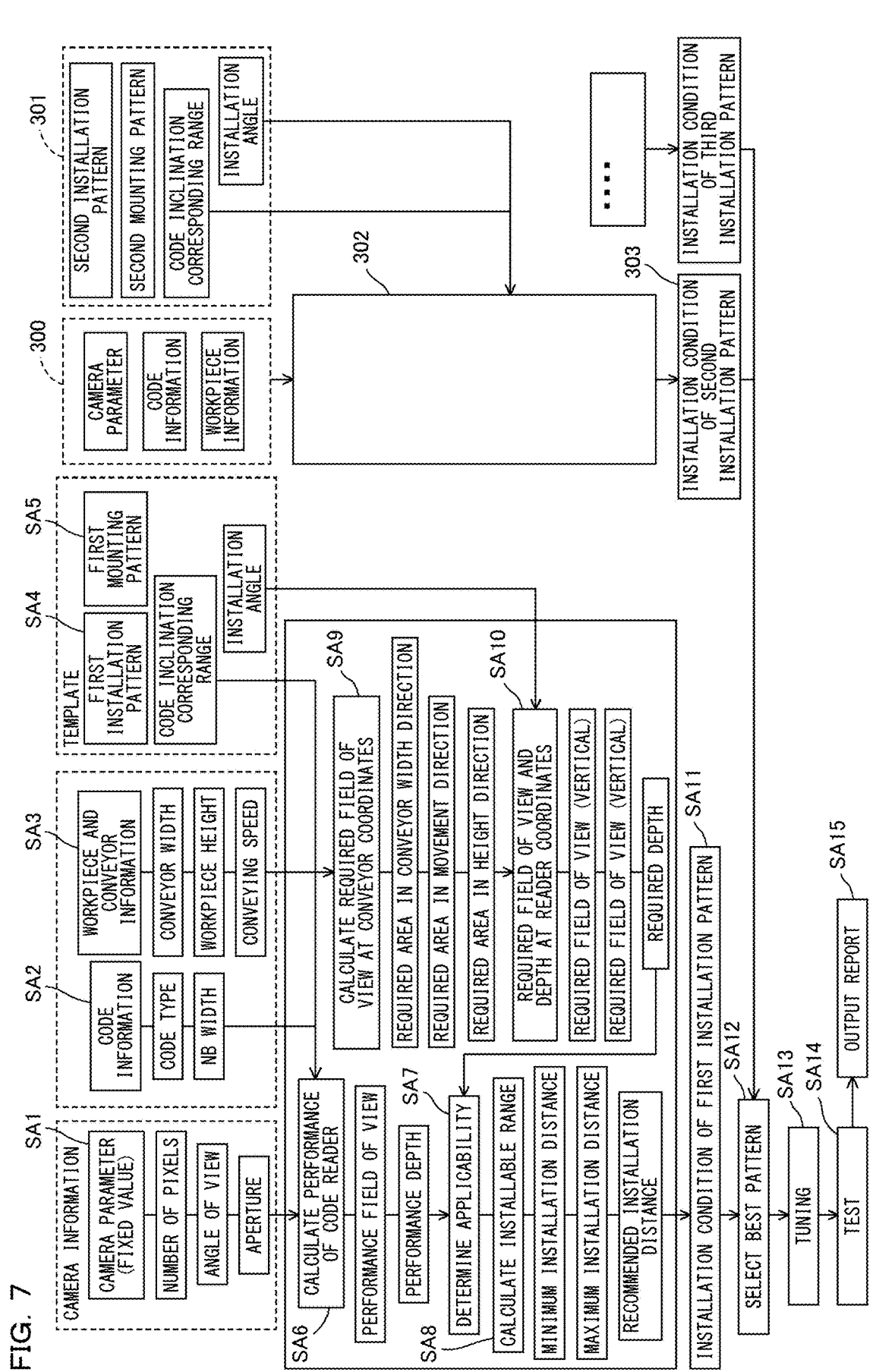
FIG. 7 is a flowchart illustrating an example of an installation support process.

In Steps SA4 and SA5 of the flowchart illustrated in FIG. 7, the user inputs a first installation pattern and a first mounting pattern by operating the input unit 43. First, the installation pattern will be described. The installation pattern is a pattern illustrating a relative positional relationship of the code reader 1 with respect to the workpiece W, and there are a plurality of installation patterns when there is one code reader 1 as illustrated in FIG. 15, and there are a plurality of installation patterns when there are a plurality of the code readers 1 as illustrated in FIG. 16. The installation patterns illustrated in FIG. 15 include an installation pattern in which the code reader 1 is installed at a position where the code on the top surface of the workpiece W is read, an installation pattern in which the code reader 1 is installed with an angle with respect to a front or rear surface or a side surface (reference surface) of the workpiece W, an installation pattern in which the code reader 1 is installed at a position where the code on the side surface of the workpiece W is read, and the like. In addition, the installation patterns illustrated in FIG. 16 include an installation pattern in which the code readers 1 are installed such that the code is read from four directions with respect to the workpiece W, an installation pattern in which the code readers 1 are installed, respectively, on the lateral side and the obliquely upper side the workpiece W, and the like. The installation pattern in which the code reader 1 is installed with the angle with respect to the reference surface (a surface to which the code to be read is attached, the surface to be imaged) includes, for example, inclination angle information (for example, 15°, 30°, and the like) of an imaging surface of the code reader 1 with respect to the reference surface as mounting angle information of the code reader 1 with respect to the reference surface.

The UI management unit 40b can display diagrams, pattern names, and the like of the respective installation patterns illustrated in FIGS. 15 and 16 on the display unit 42. The drawings, pattern names, and the like of the respective installation patterns can be stored in a template storage unit 41c provided in the storage device 41 as templates indicating types of installation positions and postures of the code reader 1. The user can operate the input unit 43 to select an arbitrary installation pattern on the display unit 42 and input the selected installation pattern as the first installation pattern. The installation pattern includes the surface information to be read in the workpiece W.

Figure 18:
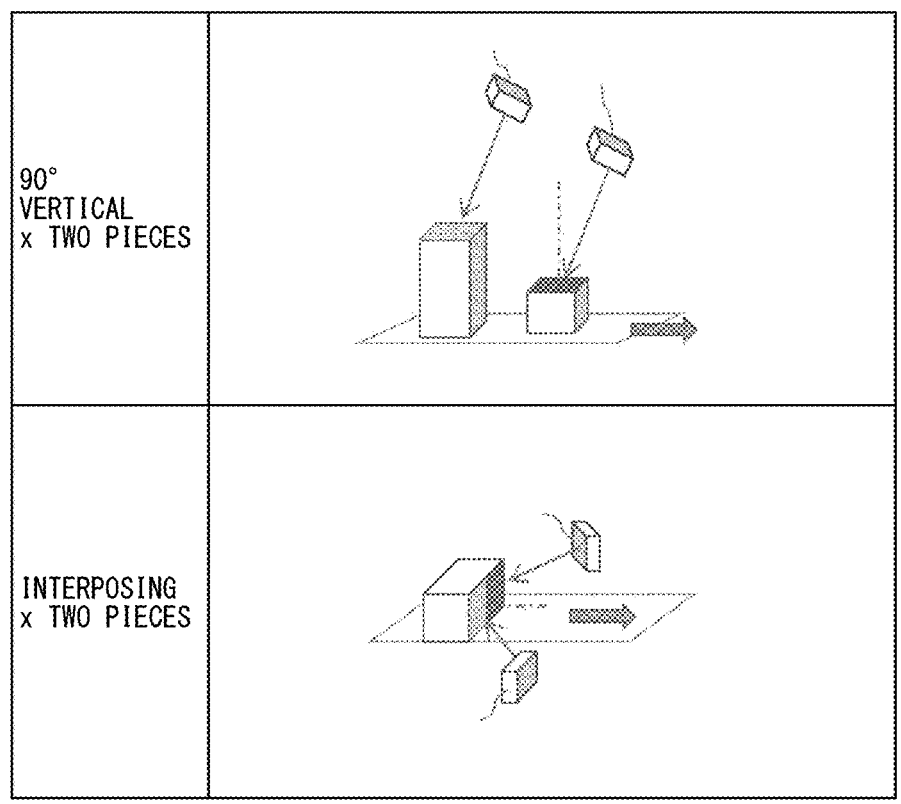
FIG. 18 is a table illustrating another mounting pattern example of the code reader.

Next, a mounting pattern will be described. As illustrated in FIGS. 17 and 18, as the mounting pattern, there are a plurality of patterns obtained by changing a position of the code reader 1 with respect to the workpiece W and a plurality of patterns obtained by changing the number of the code readers 1. The UI management unit 40b can display diagrams, pattern names, and the like of the respective mounting patterns illustrated in FIGS. 17 and 18 on the display unit 42. The drawings, pattern names, and the like of the respective mounting patterns can be stored in the template storage unit 41c provided in the storage device 41 as templates. The user can operate the input unit 43 to select an arbitrary mounting pattern on the display unit 42 and input the selected mounting pattern as the first mounting pattern. The mounting pattern also includes the surface information to be read in the workpiece W.

Any surface among the upper, lower, left, right, front, and rear surfaces of the workpiece W to be read, how much the imaging surface of the code reader 1 is inclined with respect to the conveyor, and whether the code reader is vertical or horizontal with respect to the conveyor can be set based on the installation pattern and the mounting pattern. The installation pattern and the mounting pattern input by the input unit 43 are acquired by the information acquisition unit 41c as the first installation pattern and the first mounting pattern in Steps SA4 and SA5 in FIG. 7. Since it has not been determined whether or not the first installation pattern and the first mounting pattern acquired at this stage are patterns to be recommended, these first installation pattern and first mounting pattern are stored in the storage device 41 as assumed installation position and posture of the code reader 1. It is also possible to acquire a range corresponding to the inclination of the code, an installation angle of the code reader 1, and the like by acquiring the first installation pattern and the first mounting pattern.

For example, there is a case where the periphery of the workpiece W can be covered by four code readers 1. In this case, one code reader 1 covers a range of about 90° around the workpiece W, the inclination angle of the imaging unit 5 with respect to the surface of the workpiece W becomes large, and there is a possibility that code acquisition may be restricted depending on the NB width. In order to eliminate this restriction, it is possible to propose an increase of the number of the code readers 1 to, for example, six.

As indicated by reference sign 300 in FIG. 7, a camera parameter, code information, and workpiece information can be additionally input separately from the above Steps SA1 to SA3. In this case, as indicated by reference sign 301, the user can input a second installation pattern and a second mounting pattern different from the first installation pattern and the first mounting pattern. The input second installation pattern and second mounting pattern are acquired by the information acquisition unit 41c and stored as assumed installation position and posture of the code reader 1. In this manner, the user can input a third installation pattern and a third mounting pattern, a fourth installation pattern and a fourth mounting pattern, and so on although not illustrated, and the information acquisition unit 41c also stores these in the storage device 41 as assumed installation positions and postures of the code reader 1. In other words, the plurality of assumed installation positions and postures can be stored and acquired later.

Figure 19:
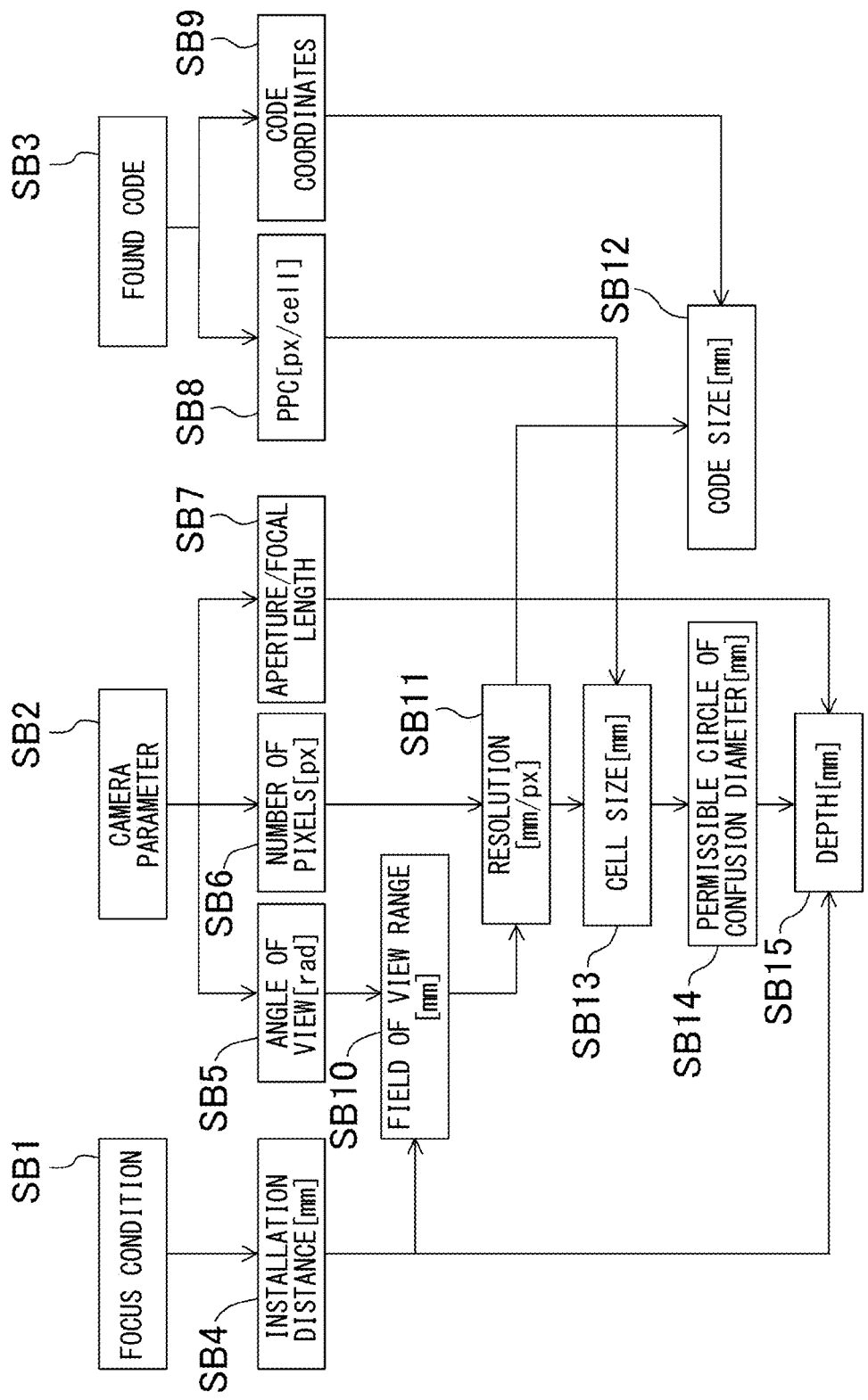
FIG. 19 is a flowchart illustrating a procedure for calculating the performance of the code reader.

In Step SA6 of the flowchart illustrated in FIG. 7, the calculation unit 40c calculates the performance of the code reader 1. A procedure for calculating the performance of the code reader 1 will be described with reference to the flowchart illustrated in FIG. 19. In Step SB1, a focus condition is assumed. After the focus condition is assumed, it is also possible to calculate a width of the focus condition that satisfies a condition by repeating the calculation of a depth and confirming whether the required depth is satisfied.

The focus condition is the amount of adjustment of the focusing lens by the AF mechanism 5c. In Step SB2, the camera parameter acquired by the information acquisition unit 40a is read. In Step SB3, the code found by search is read from the read image captured by the imaging unit 5.

In Step SB4, a distance (mm) from the imaging unit 5 to the code is obtained based on the correspondence between the amount of adjustment of the focusing lens by the AF mechanism 5c when focusing by the focusing lens is completed and the distance from the imaging unit 5 to the code. This is a current installation distance. Note that the distance from the imaging unit 5 to the code may be measured by the user using a scale or the like, and the measured value may be input as the installation distance.

In Step SB5, an angle of view (rad) of the optical system 5b stored in advance is read. In Step SB6, the number of pixels (pixels) of the imaging element 5a is read in a format of, for example, 1280 vertical pixels×768 horizontal pixels. The number of pixels of the imaging element 5a is known, and may be stored in the storage device 41 in advance. In Step SB7, information on the aperture and focal length of optical system 5b is read. Current aperture and focal length of the optical system 5b may be output to the calculation unit 40c.

In Step SB8, PPC (pixels/cell) is calculated. In Step SB9, coordinates of the code are read. The coordinates of the code can be obtained, for example, by estimating a central portion of the code and obtaining X and Y coordinates of the central portion, but may be coordinates of an end portion of the code.

In Step SB10, a range of a field of view of the imaging unit 5 is calculated. The range of the field of view h can be calculated from Formula (1).

$$h = 2d \cdot \tan(\theta/2) \quad (1)$$

Here, d is a current installation distance, and $\theta$ is an angle of view of the optical system 5b.

In Step SB11, a resolution r, that is, an actual length represented by one pixel constituting image data is calculated. The resolution r can be calculated from Formula (2).

$$\text{Resolution } (r) = h/n \quad (2)$$

Here, n is the number of pixels in the horizontal direction of the imaging element 5a.

In Step SB12, a size of the code (code size) is calculated. A code size CS (mm) can be obtained by multiplying the resolution r calculated from Formula (2) by the number of pixels in the horizontal direction of the code. The number of pixels in the horizontal direction of the code can be obtained from the image data.

In Step SB13, a size of a cell (cell size) is calculated. The cell is the smallest unit constituting the code. A cell size p can be obtained by multiplying the resolution r calculated from Formula (2) by the number of pixels in the horizontal direction of the cell. The number of pixels in the horizontal direction of the cell can be obtained from the image data. The cell size p is calculated by a cell size setting unit 30.

In Step SB14, a permissible circle of confusion diameter (mm) is set. The permissible circle of confusion diameter does not consider movement and indicates the degree of defocus caused by a lens. The permissible circle of confusion diameter can also be expressed by the number of cells constituting the code. In addition, a maximum permissible blur amount is obtained in advance and can be stored in the storage device 41.

In Step SB15, a front depth of field (mm) is calculated from Formula (3), and a rear depth of field (mm) is calculated from Formula (4).

$$\text{Front depth or field } Df = (\delta F d2)/(f2 + \delta F d) \quad (3)$$

$$\text{Rear depth of field } Db = (\delta F d2)/(f2 - \delta F d) \quad (4)$$

Here, F is an aperture of the optical system 5b, and f is a focal length of the optical system 5b. In addition, δ is a permissible circle of confusion diameter. As described above, the calculation unit 40c can determine a performance field of view and a performance depth of the code reader 1.

In Step SA9 of the flowchart illustrated in FIG. 7, a field of view required to read the code based on the workpiece information and the conveyor information acquired in Step SA3 is calculated with reference to coordinates of the conveyor. Information on the required field of view includes a required area in a conveyor width direction, a required area in a workpiece movement direction, a required area in a workpiece height direction, and the like.

In Step SA10, the field of view and depth required to read the code based on the installation pattern and the mounting pattern acquired in Steps SA4 and SA5 are calculated with reference to coordinates of the code reader 1. Information on the required field of view and depth includes a field of view in the vertical direction, the required depth, and the like. As described above, in Steps SA9 and SA10, the calculation unit 40c can determine the required field of view and depth of the code reader 1 required to read the code under the environment specified by the environment information based on the environment information acquired by the information acquisition unit 40a.

In Step SA7, it is determined whether or not the performance field of view and the performance depth of the code reader 1 calculated in Step SA6 can satisfy the required field of view and depth calculated in Steps SA9 and SA10. When it is determined in Step SA7 that the performance field of view and the performance depth of the code reader 1 satisfy the required field of view and depth, the process proceeds to Step SA8 to calculate an installable range of the code reader 1. The installable range of the code reader 1 includes a minimum installation distance, a maximum installation distance, a recommended installation distance, and the like. In addition, the installable range of the code reader 1 may be calculated in the same manner even when it is determined in Step SA7 that the performance field of view and the performance depth of the code reader 1 do not satisfy the required field of view and depth. The determination result in Step SA7 is stored.

In addition, the installation pattern and the mounting patterns of all the templates or a plurality of arbitrary templates stored in the template storage unit 41c may be determined in Step SA7. In other words, it is possible to specify the installation pattern, which is the recommended installation position and posture of the code reader 1, from among those patterns by performing determination in Step SA7 for all the templates in a brute-force format.

In Step SA11, when it is determined in Step SA7 that the performance field of view and the performance depth of the code reader 1 satisfy the required field of view and depth, the first installation pattern and the first mounting pattern are determined as the recommended installation position and posture of the code reader 1 that can satisfy the required field of view and depth. In addition, when it is determined in Step SA7 that the performance field of view and the performance depth of the code reader 1 do not satisfy the required field of view and depth, the first installation pattern and the first mounting pattern are determined as patterns that are not capable of satisfying the required field of view and depth. This step is executed by the calculation unit 40c.

In addition, processing indicated by reference sign 302 in FIG. 7 is the same as in Steps SA6 to SA10. When it is determined that the performance field of view and the performance depth of the code reader 1 satisfy the required field of view and depth in processing indicated by reference sign 302, the process proceeds to a step indicated by reference sign 303, and the second installation pattern and the second mounting pattern are determined as the recommended installation position and posture of the code reader 1 that can satisfy the required field of view and depth. In addition, when it is determined that the performance field of view and the performance depth of the code reader 1 do not satisfy the required field of view and depth in the processing indicated by reference sign 302, the second installation pattern and the second mounting pattern are determined as patterns that are not capable of satisfying the required field of view and depth in the step indicated by reference sign 303. Similarly, the determination can be also made for the third installation pattern and the third mounting pattern, the fourth installation pattern and the fourth mounting pattern, and the like.

In Step SA12, the best pattern is selected from among the plurality of installation patterns and mounting patterns. That is, when the field of view and depth at the assumed installation position and posture acquired by the information acquisition unit 40a do not satisfy the required field of view and depth, the calculation unit 40c executes a change process of changing at least one of the assumed installation position and posture, performs the determination on the assumed installation position and posture after having been subjected to the change process, and repeats the change process and the determination to determine the installation pattern which is the recommended installation position and posture of the code reader. For example, when the first installation pattern and the first mounting pattern do not satisfy the required field of view and depth, the installation pattern and the mounting pattern are changed to the second installation pattern and the second mounting pattern, and whether or not the second installation pattern and the second mounting pattern satisfy the required field of view and depth is determined. At this time, it is possible to determine whether or not the required field of view and depth are satisfied by changing only one of the installation position and the posture of the code reader 1.

A plurality of recommended installation positions and postures of the code reader 1 may be presented without selecting the best pattern in Step SA12, and any pattern may be selected as the user operates the input unit 43. At this time, a pattern that has not been determined as the recommended installation position and posture of the code reader 1 may be presented to the user.

In addition, a criteria for selection of the best pattern in Step SA12 may be changeable. For example, a pattern with the smallest number of code readers 1 can be set as the best pattern, or a pattern with the lowest total cost of equipment in use can be set as the best pattern.

Thereafter, the process proceeds to Step SA13 to execute optimization (tuning) of a reading parameter, and then, a reading test is executed in Step SA14. Finally, the process can proceed to Step SA15 to output a report. Steps SA13 to SA15 may be executed as needed and may be omitted. Details of Steps SA13 to SA15 will be described later.

[Parameter Set (Bank)]

FIG. 20 is a view illustrating an example of a user interface screen 400 displayed when installation support is performed by the installation support device A. The user interface screen 400 can be generated by the UI management unit 40*b* and displayed on the display unit 42. A plurality of tabs 401, 402, and 403 are provided on the upper part of the user interface image 400, and any one of the plurality of tabs 401, 402, and 403 can be selected.

FIG. 20 illustrates a case where the bank tab 402 is selected. One parameter set is referred to as the "bank". In the example illustrated in FIG. 20, only Bank 1 and Bank 2 are displayed, but the number of banks can be set arbitrarily.

As a common setting item for each bank, provided are "decoding timeout value" that indicates the timeout time of a decoding process, "black and white inversion" that inverts black and white of a read image, "internal lighting" that switches on and off of the internal lighting constituted by the illumination unit 4 mounted on the housing 2, "external lighting" that switches on and off of the external lighting constituted by the illumination unit 4 configured as a separate body from the housing 2, and "detailed code settings" for switching a code type. In addition, as reading setting items, "exposure time" that indicates the exposure time by the imaging unit 5, "gain" that indicates the gain of the imaging unit 5, "contrast adjustment scheme" that indicates a method for adjusting the contrast of a read image, a "first image filter" and a "second image filter" that select types and order of image filters to be applied, and the like are provided in each bank.

In the code reader 1, the user can select a bank to be used during the operation time of the code reader 1 from among a plurality of banks stored in the parameter set storage unit 53. That is, the user can operate the input unit 43 while viewing the user interface image 400 illustrated in FIG. 20 and select an arbitrary bank on the user interface image 400.

[User Interface Screen During Installation Support]

Figure 21:
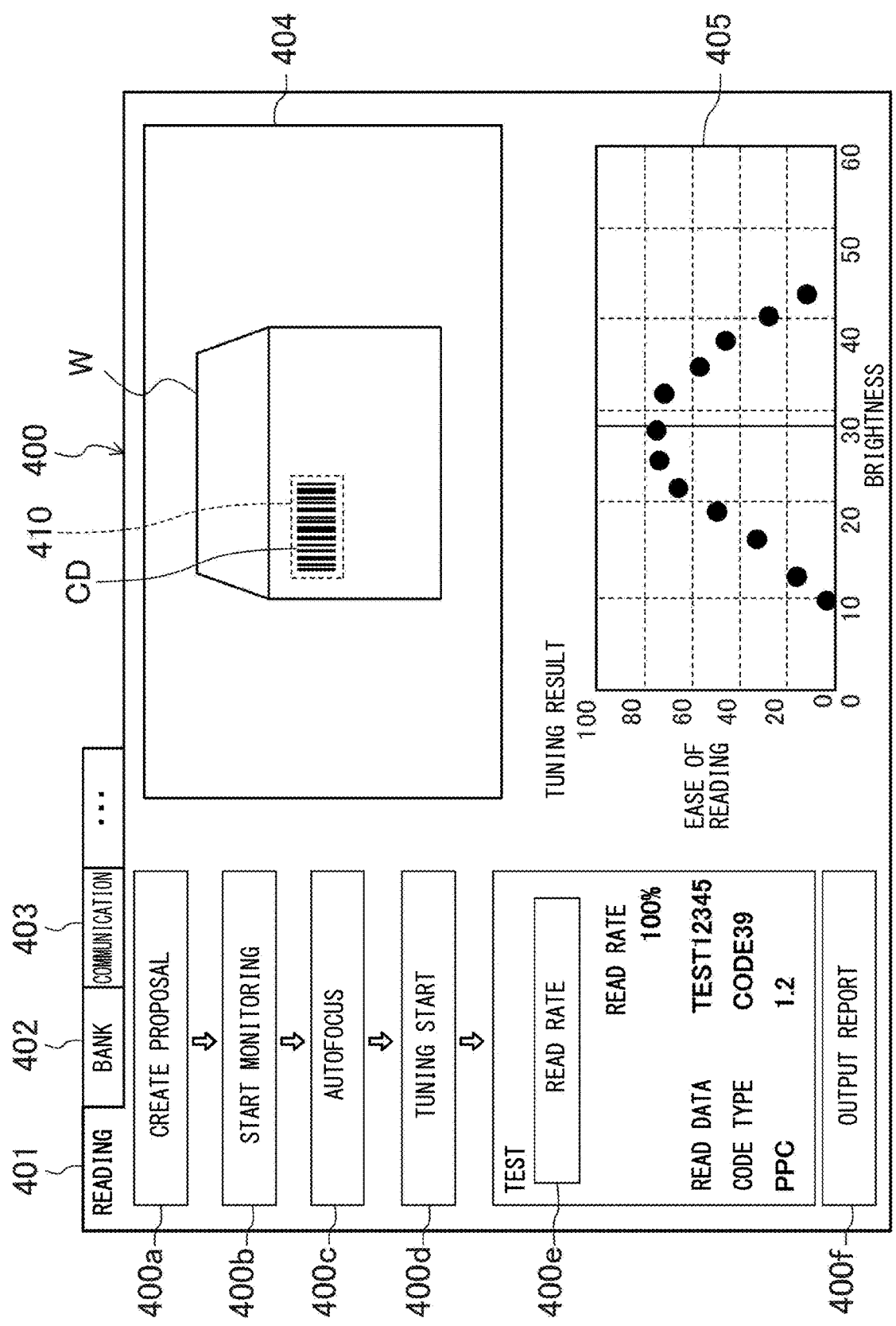
FIG. 21 illustrates an example of a user interface screen displayed when installation support is performed by the installation support device, and is a view when a reading tab is selected.

FIG. 21 illustrates a case where the reading tab 401 of the user interface screen 400 is selected, and can be displayed during installation support. The user interface screen 400 illustrated in FIG. 21 is provided with a read image display area 404 that displays a read image captured by the imaging unit 5 and a tuning result display area 405 that displays a tuning result. In the tuning result display area 405, for example, a graph illustrating the relationship between the ease of reading and brightness is displayed. Further, a proposal creation button 400*a*, a monitor start button 400*b*, an autofocus button 400*c*, a tuning start button 400*d*, a reading rate button 400*e*, and a report output button 400*f* are also provided.

When detecting that the proposal creation button 400*a* has been operated, the UI management unit 40*b* displays the user interface screens 200 to 206 (illustrated in FIGS. 8 to 14), configured to prompt the user to input information required for installation support, in the above-described order. As a result, each information can be acquired by the information acquisition unit 40*a*. In addition, the mounting patterns illustrated in FIGS. 15 to 18 are also prompted to be input by the user, and are acquired as information by the information acquisition unit 40*a*.

When detecting that the monitor start button 400*b* has been operated, the UI management unit 40*b* causes the imaging unit 5 to execute a read image generation process. The generated read image is displayed in the read image display area 404.

When the UI management unit 40*b* detects that the autofocus button 400*c* has been operated, the AF control unit 21 controls the AF mechanism 5*c* to execute focusing. In this example, a state where a one-dimensional code CD is attached to the workpiece W is illustrated, but a two-dimensional code may be attached. In the read image display area 404, a frame line 410 surrounding an area where the code CD is highly likely to exist is also displayed. Note that there is a case where two or more codes CD are displayed in the read image display area 404 when the two or more codes CD are attached to the workpiece W.

Thereafter, when detecting that the tuning start button 400*d* has been operated, the UI management unit 40*b* causes the tuning execution unit 24 illustrated in FIG. 2 to execute a reading parameter optimization process. This process corresponds to Step SA13 in FIG. 7.

The tuning execution unit 24 causes the imaging unit 5 to acquire a plurality of read images while changing the brightness (the exposure time, the gain, the amount of light of the illumination unit 4, and the like), for example, and causes the processing unit 32 to execute a decoding process on each of the read images. As a result, the tuning execution unit 24 can acquire a graph representing the brightness and the ease of reading of the read image as illustrated in the tuning result display area 405 illustrated in FIG. 21. The ease of reading can be obtained from, for example, the above-described reading margin. As a result, the optimum reading parameters can be acquired. The optimum reading parameters are stored as a parameter set in a bank illustrated in FIG. 20, and displayed on the display unit 42 and thus can be confirmed by the user.

When detecting that the reading rate button 400*e* has been operated, the UI management unit 40*b* causes the imaging unit 5 to reflect the tuning result and generate a new read image, and causes the processing unit 32 to execute a decoding process on the generated read image. This is a reading test mode for testing the stability of reading, which corresponds to the processing of Step SA14 illustrated in FIG. 7. For example, reading can be tried ten times, and results thereof can be displayed in the tuning result display area 405.

The reading test mode includes a task test mode, a depth test mode, and a speed test mode. The task test mode is a mode for measuring a reading time, and a current reading time, the longest reading time, and the shortest reading time are displayed on the display unit 42.

The depth test mode is a mode for measuring a maximum readable depth, and for example, a relative positional relationship between the code reader 1 and a readable code can be drawn and displayed on the display unit 42. The shortest distance and the longest distance between the code reader 1 and the readable code can be displayed on the display unit 42.

In the speed test mode, the moving workpiece W is successively read, and the speed of the workpiece W is calculated from the number of times the code is read and positions thereof, and is displayed on the display unit 42. The speed of the workpiece W can be calculated and displayed substantially in real time. The speed of the workpiece W may be displayed in a numerical value or in a bar format.

[Example of Presentation Form with Respect to User]

Figure 22:
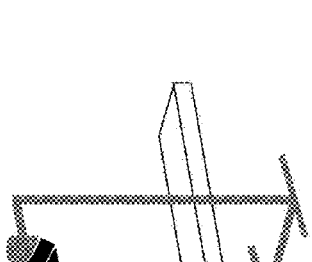
FIG. 22 is a view illustrating an example of a presentation form with respect to a user.

FIG. 22 is a view illustrating an example of a presentation form with respect to the user. A user interface screen 220 for presentation illustrated in this drawing can be generated by the UI management unit 40*b* and displayed on the display unit 42. The respective pieces of information constituting the user interface screen 220 for presentation include the calculation result of the calculation unit 40*c*, the information acquired by the information acquisition unit 40*a*, and the like, and these are output from the output unit 40*d* to the UI management unit 40*b*. The UI management unit 40*b* can generate the user interface screen 220 for presentation based on the respective pieces of information.

The user interface screen 220 for presentation is provided with a list display button 220a, a frame option selection area 220b, a code reader selection area 220c, a model selection area 220d, a distance adjustment area 220e, a total result display area 220f, a layout preview area 220g, a first layout diagram display area 220h, a second layout diagram display area 220i, and the like.

When detecting that the list display button 220a has been operated, the UI management unit 40b generates a list of devices in use as illustrated in FIG. 23 and displays the list of devices in use on the display unit 42. The list of devices in use displays names of devices required in the case of installing the code reader 1 at the recommended installation position and posture, models thereof, and the number of the devices. That is, the output unit 40d can output the component information required to realize the installation pattern indicating the recommended installation position and posture and the component table illustrating the required number of the components. The component that has been presented can be also changed.

The frame option selection area 220b is an area for switching of whether or not to propose a frame option. The proposal is made in consideration of a frame restriction when the frame option is proposed, but the proposal is made without any frame restriction when the frame option is not proposed.

The code reader selection area 220c is an area for selection of an arbitrary code reader 1 in the case of the installation pattern in which the plurality of code readers 1 are installed. The model selection area 220d is an area for displaying a model format and the like, that is, model information when the optimum model has been automatically proposed. In the model selection area 220d, the user can also select an arbitrary model, and the selected model can be used to determine suitability. The distance adjustment area 220e is an area operated when the user finely adjusts the installation position of the code reader 1. The suitability of the adjustment result can be determined. The total result display area 220f is an area for displaying whether or not reading is possible with the information displayed in the code reader selection area 220c, the model selection area 220d, the distance adjustment area 220e, and the like. When reading is not possible, any degree of insufficiency for a requirement can be also displayed in the total result display area 220f.

The layout preview area 220g is an area for displaying the relative positional relationships among the code reader 1, the workpiece W, and the conveyor, the dimensions of the respective parts, and the like in a drawing. In addition, the mounting angle information of the code reader 1 and the reading surface (surface information) of the workpiece W are also included. A bird's-eye view preview image can be generated while changing the viewpoint by 360°, and displayed in the layout preview area 220g. The viewpoint can be changed by the input unit 43. The first layout diagram display area 220h is an area for displaying a diagram illustrating the relative positional relationships among the code reader 1, the workpiece W, and the conveyor, the dimensions of the respective parts, and the like in a front view. In addition, the second layout diagram display area 220i is an area for displaying a diagram illustrating the relative positional relationships among the code reader 1, the workpiece W, and the conveyor, the dimensions of the respective parts, and the like in a side view.

Figure 24:
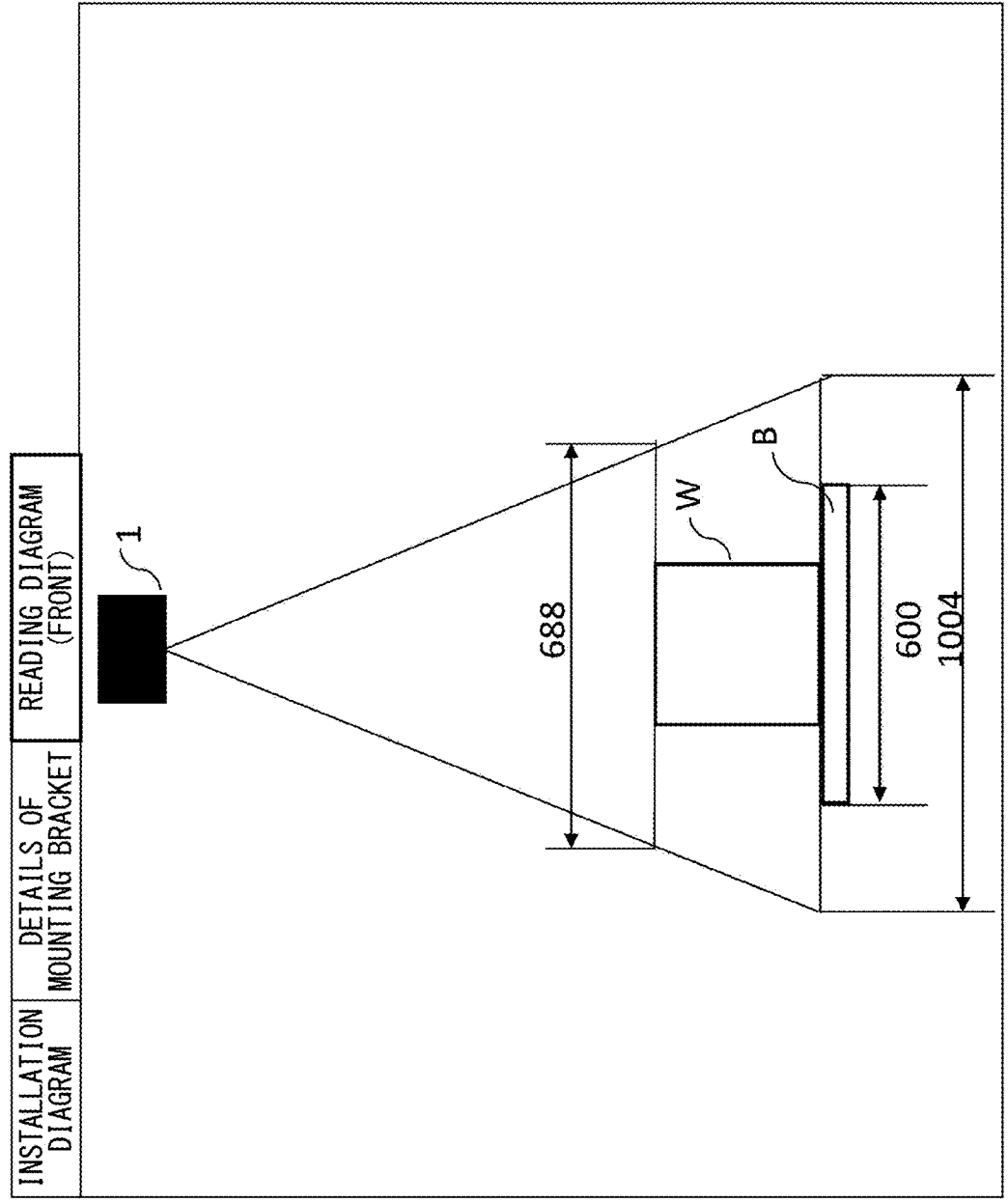
FIG. 24 is a view illustrating a display example of a workpiece and a readable range from a top view.
Figure 25:
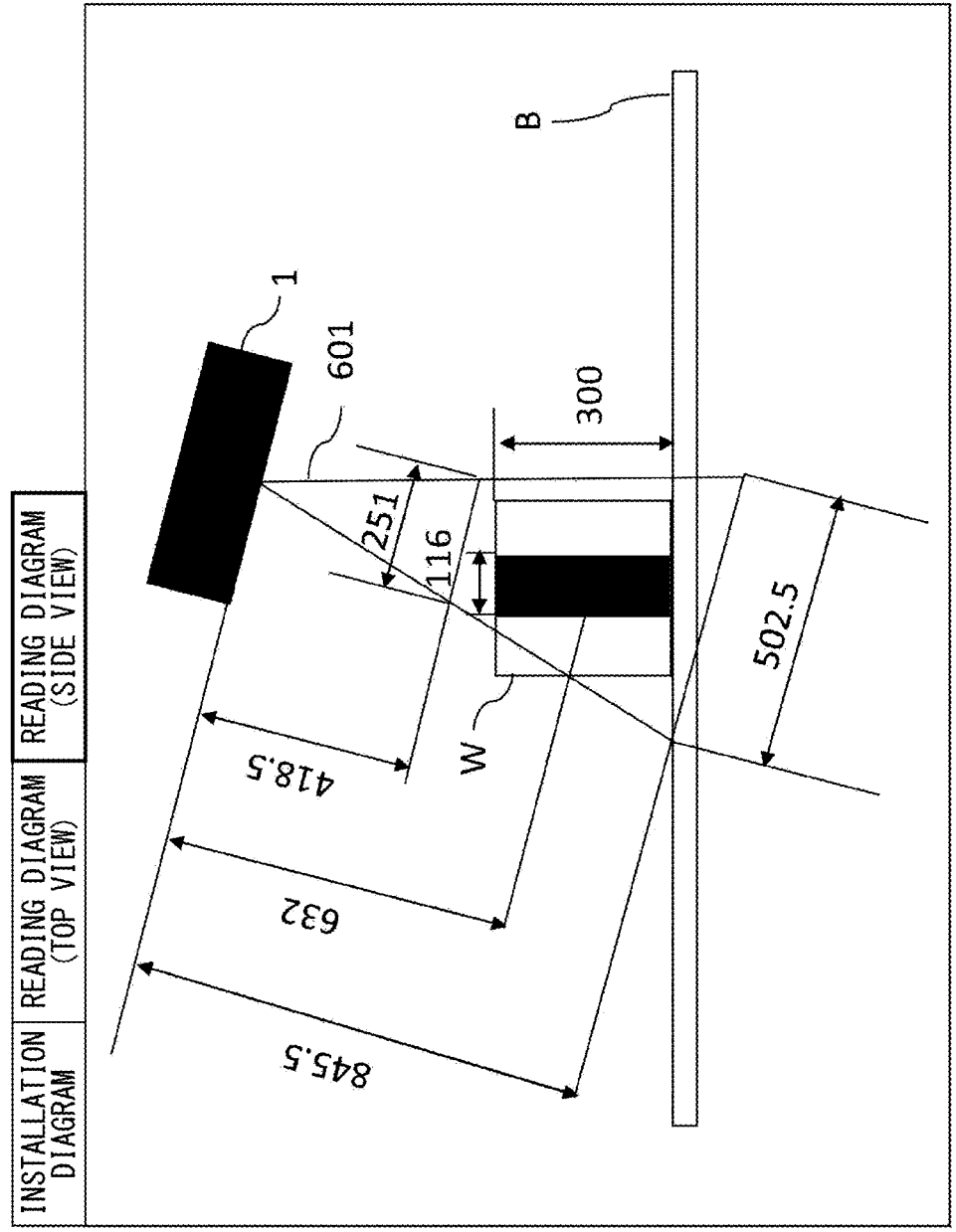
FIG. 25 is a view illustrating a display example of a workpiece and a readable range from a side view.
Figure 26:
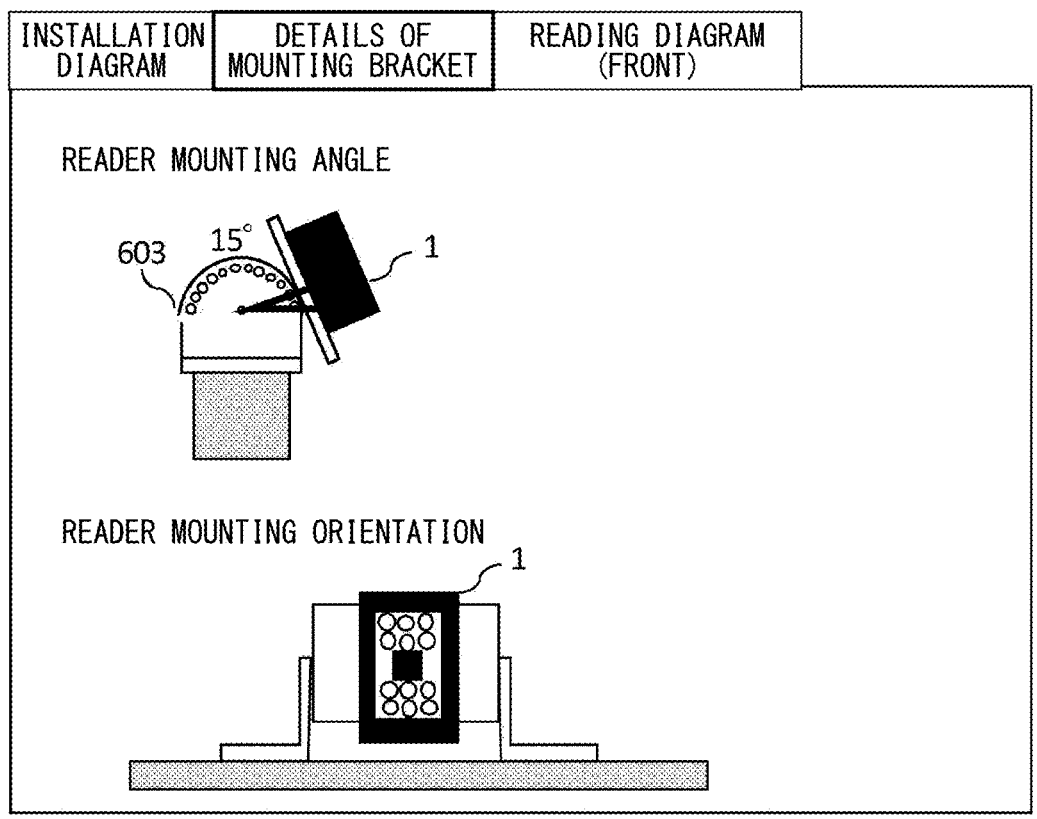
FIG. 26 is a view illustrating a detailed display example of a mounting bracket.

As illustrated in FIG. 24, the workpiece W and a readable range 600 in a top view can be also displayed in the first layout diagram display area 220h or the second layout diagram display area 220i. As illustrated in FIG. 25, the workpiece and a readable range 601 in a side view can be also displayed in the first layout diagram display area 220h or the second layout diagram display area 220i. As illustrated in FIG. 26, a details of the mounting bracket 603 can be also displayed in the first layout diagram display area 220h or the second layout diagram display area 220i. Detailed information of the mounting bracket 603 includes the mounting angle information of the code reader 1.

[Report Output]

As a form of presenting the recommended installation pattern of the code reader 1 to the user, a presentation form in a report may be also adopted in addition to the form in which the user interface screen is displayed on the display unit 42 as described above. The report may be presented as electronic data or may be presented in a paper medium printed by the printer 45 illustrated in FIG. 2.

The report will be described hereinafter. When detecting that the report output button 400f of the user interface screen 400 illustrated in FIG. 21 has been operated, the UI management unit 40b executes Step SA15 of the flowchart illustrated in FIG. 7. In this step, first, each piece of information constituting the report is prepared. The respective pieces of information constituting the report include the calculation result of the calculation unit 40c, the information acquired by the information acquisition unit 40a, and the like.

Figure 27:
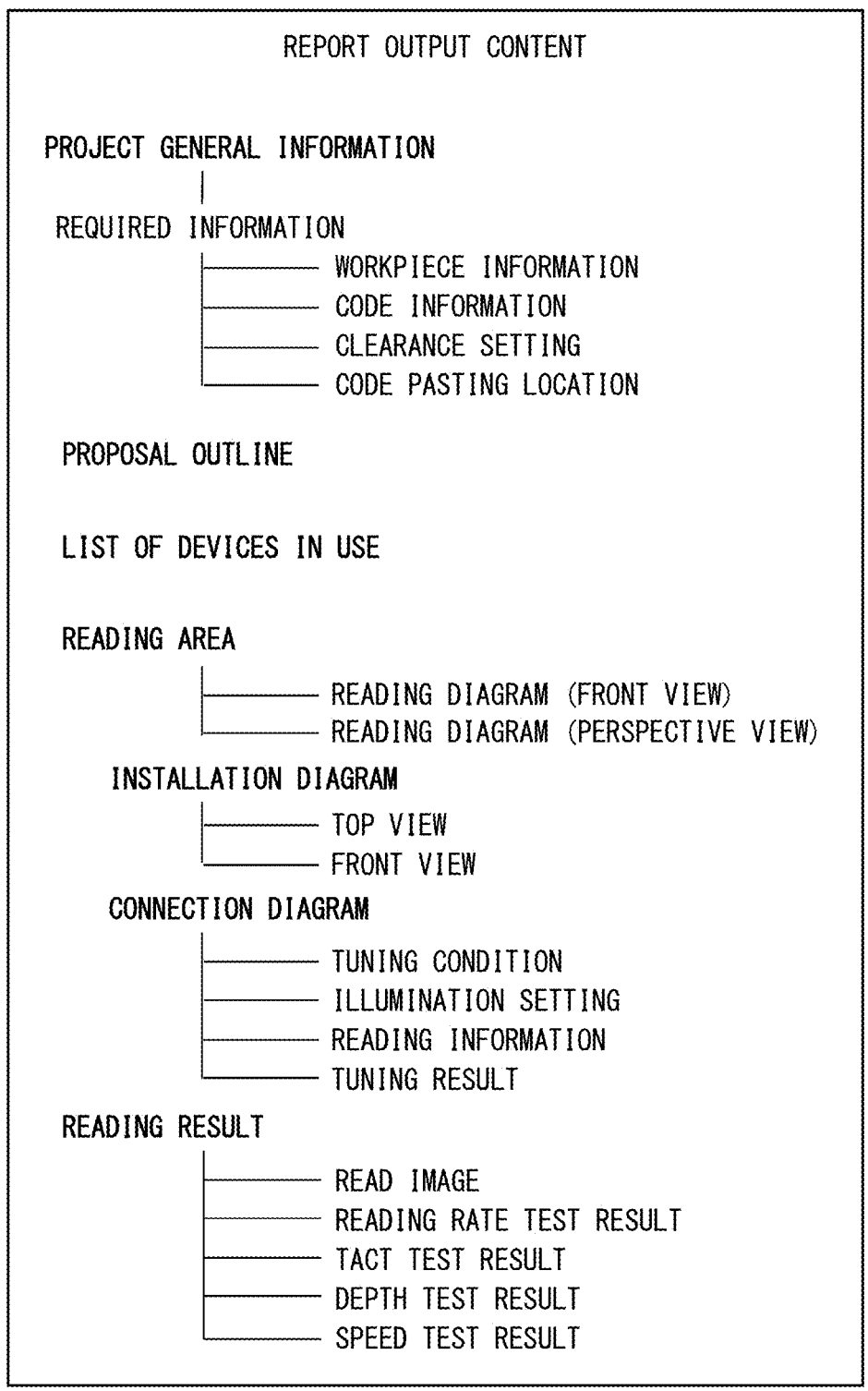
FIG. 27 is a view illustrating a structure of a report.

A structure of the report output by the output unit 40d will be described with reference to FIG. 27. The content output as the report roughly includes project general information, a proposal outline, a list of devices in use, a reading area, an installation diagram, a connection diagram, and a reading result, but not all of them are required.

The project general information in the report includes not only a user's project name but also, as required information required by the project, workpiece information, code information, clearance setting information, and information on a code pasting location. The workpiece information is configured using the information input on the user interface screen for input of workpiece information illustrated in FIG. 10. The code information is configured using the information input on the user interface screen for input of the code information illustrated in FIG. 13. The clearance setting information is configured using the information input on the user interface screen for clearance installation illustrated in FIG. 9. The information on the code pasting location is configured using the information input on the user interface screen for setting of the code pasting position illustrated in FIG. 11.

The proposal outline of the report includes a drawing and the like displayed in the layout preview area 220g of the user interface screen 220 for presentation illustrated in FIG. 22. In other words, the proposal outline is information that allows the user to roughly grasp the relative positional relationships among the code reader 1, the workpiece W, and the conveyor.

For the list of devices in use of the report, for example, it is possible to present the names, models, and number of devices required when installing the code reader 1 at the recommended installation position and posture to the user using the format of the list of devices in use illustrated in FIG. 23.

In the reading area of the report, a reading diagram in a front view, a reading diagram from a perspective view, and the like are displayed. On these drawings, a readable area can be indicated by color coding or the like. In addition, when a plurality of code readers are installed, readable areas of the respective code readers may be indicated by color coding or the like.

The installation diagram of the report includes an installation diagram in the front view displayed in the first layout diagram display area 220h of the user interface screen 220 for presentation illustrated in FIG. 22, an installation diagram in the side view displayed in the second layout diagram display area 220i, a top view, and the like are displayed.

Figure 28:
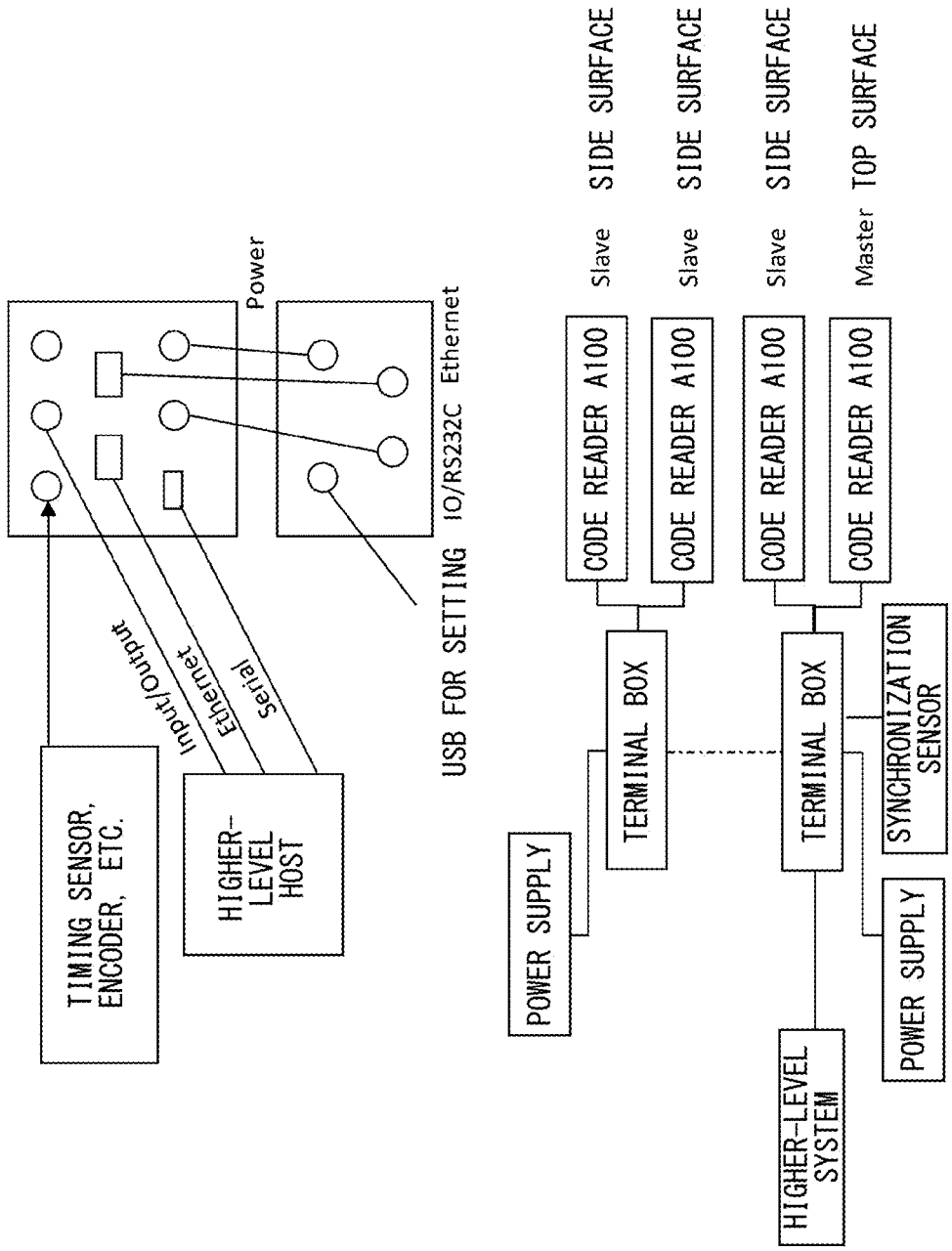
FIG. 28 is a view illustrating an example of a page on which a connection diagram of the report is described.

As the connection diagram of the report, a connection diagram of the code reader 1 as illustrated in FIG. 28 can be illustrated. In this connection diagram, each form of connection with an encoder or the like, connection with a higher-level host, and connection with a power supply is illustrated, and a connection form with a higher-level system via a terminal box is also illustrated.

In addition, the report can include tuning conditions such as the model information and the exposure time, information on the use and non-use of the internal lighting and external lighting, reading information illustrating the relationship between the brightness and the ease of reading, the read image, and the tuning result (parameter set or the like). The tuning result may be provided as electronic data so as to be usable by being imported into the code reader 1.

The reading result of the report includes a read image, a reading rate test result, a tact test result, a depth test result, a speed test result, and the like. In addition, the reading rate test result includes a reading rate (%), a bank number, a code type, a narrow bar width, and the like in addition to read data. The tact test result includes the bank number, the time required for reading (tact), and the like in addition to the read data. The depth test result includes a focal length, a depth and a field of view at the shortest readable distance, a depth and a field of view at the longest readable distance, and the like in addition to a reading depth. The speed test result includes the speed of the workpiece W calculated in the speed test mode.

[Modification of Presentation Form with Respect to User]

As a form of presenting a recommended installation pattern of the code reader 1 to the user, for example, two-dimensional CAD data or three-dimensional CAD data (CAD file) in which the recommended installation pattern is drawn may be output from the output unit 40d. As a diagram illustrating the recommended installation pattern, for example, a diagram similar to the diagram displayed in the layout preview area 220 g of the user interface screen 220 for presentation illustrated in FIG. 22 can be used. As the user is provided with CAD data of the recommended installation pattern, the design man-hours on the user side can be reduced.

In addition, the calculation unit 40c can grasp the conveying speed of the conveyor and the layout of the code reader 1, and thus, can acquire the code reading timing by calculation. This reading timing can also be presented to the user. In addition, the presentation can be performed to be intuitively and easily understandable for the user by converting time information into distance information.

In addition, in the case of the workpiece W covered with a transparent film or the like, a polarizing plate can be attached in front of the imaging unit 5. When the polarizing plate is attached, the brightness of the imaging unit 5 decreases, and such a decrease in brightness can be dealt with by moving the code reader 1 closer to the workpiece W. As the amount of the decrease in brightness due to the polarizing plate in advance, an installation position of the code reader 1 when the polarizing plate is attached can be calculated and presented to the user.

[Computer Program]

A computer program installed in the installation support device A causes the installation support device A to execute each of the above-described functions, in particular, the acquisition step of acquiring the camera information and the environment information and the calculation step of determining the installation pattern which is the recommended installation position and posture of the code reader 1. The computer program can be stored in the storage device 41. In addition, the computer program can be stored in various storage media such as an optical disc and be distributed on the market, and further, can also be stored on a server, downloaded via the Internet, installed on the computer, and used by the user. The computer on which this program has been installed can serve as the installation support device A.

Function and Effect of Embodiment

As described above, according to the present embodiment, not only the recommended installation position of the code reader 1 but also the posture of the code reader 1 at the recommended installation position is also determined by the calculation unit 40c of the installation support device A, and thus, the user can confirm both the position and the posture before installing the code reader 1. In addition, it is sufficient for the user to install the code reader 1 so as to have the determined posture when installing the code reader 1 at the determined recommended installation position, which facilitates the installation work.

The above-described embodiments are merely examples in all respects, and should not be construed as limiting. Further, all modifications and changes belonging to the equivalent range of the claims fall within the scope of the present aspect.

INDUSTRIAL AVAILABILITY

As described above, the installation support device for the stationary code reader according to the present aspect can be used in the case of presenting the installation position and posture of the code reader before installing the code reader.

What is claimed is:

1. A method comprising, at an electronic device with a display:
    displaying, on the display, a user interface screen configured to show a first information input area for allowing a user to input at least one of a conveyor information related to a conveyor and a workpiece information related to a workpiece conveyed by the conveyor, a second information input area for allowing a user to input an installation position of a code reader, and an image display area for drawing an image of the conveyor and the code reader;
    detecting a first user input through at least one of the first information input area and the second information input area of the user interface screen; and
    in response to detecting the first user input, displaying, on the display, the user interface screen showing the image display area including the image of the conveyor and the code reader drawn based on the first user input.

2. The method of claim 1, further comprising:
    detecting a second user input including an updated information for updating the installation position of the code reader via the second information input area of the user interface screen; and in response to detecting the second user input including the updated information, displaying, on the display, the user interface screen showing the image display area including a redrawn image of the conveyor and the code reader reflecting the updated information input by the user.

3. The method of claim 1, wherein the image display area shows a first image of the conveyor and the code reader in a first view angle and a second image of the conveyor and the code reader in a second view angle different from the first view angle.

4. The method of claim 3, wherein the image display area shows the first image and the second image at the same time.

5. The method of claim 3, wherein the image display area shows the first image in a front view and the second image in a side view.

6. The method of claim 3, wherein the image display area shows a readable range of the code reader in at least one of the first view angle and the second view angle.

7. The method of claim 1, wherein the image display area shows a relative positional relationship of the conveyor and the code reader.

8. The method of claim 1, wherein the user interface screen shows a plurality of installation patterns for allowing a user to select an arbitrary installation pattern, the method further comprising:
   detecting a third user input indicating a selection of the arbitrary installation pattern; and
   in response to detecting the third user input, displaying, on the display, the user interface screen showing the image display area including the image of the conveyor and the code reader drawn based on the first user input and the third user input.

9. The method of claim 8, wherein the plurality of installation patterns includes a first installation pattern for reading a single surface of a workpiece and a second installation pattern for reading a first plurality of surfaces of the workpiece.

10. The method of claim 9, wherein the plurality of installation patterns further includes a third installation pattern for reading a second plurality of surfaces of the workpiece, the second plurality of surfaces being greater than the first plurality of surfaces.

11. A system for a stationary code reader that supports installation of the stationary code reader, comprising:
   a user interface process that generates a user interface screen showing a first information input area for allowing a user to input at least one of a conveyor information related to a conveyor and a workpiece information related to a workpiece conveyed by the conveyor, a second information input area for allowing a user to input an installation position of a code reader, and an image display area for drawing an image of the conveyor and the code reader;
   wherein the user interface process generates, in response to detecting a first user input through at least one of the first information input area and the second information input area of the user interface screen, the user interface screen showing the image display area including the image of the conveyor and the code reader drawn based on the first user input.

12. The system of claim 11, wherein the user interface process generates, in response to detecting a second user input including an updated information for updating the installation position of the code reader via the second information input area of the user interface screen, the user interface screen showing the image display area including a redrawn image of the conveyor and the code reader reflecting the updated information input by the user.

13. The system of claim 11, wherein the image display area shows a first image of the conveyor and the code reader from a first view angle and a second image of the conveyor and the code reader from a second view angle different from the first view angle.

14. The system of claim 13, wherein the image display area shows the first image and the second image at the same time.

15. The system of claim 13, wherein the image display area shows the first image in a front view and the second image in a side view.

16. The system of claim 13, wherein the image display area shows a readable range of the code reader in at least one of the first view angle and the second view angle.

17. The system of claim 11, wherein the image display area shows a relative positional relationship of the conveyor and the code reader.

18. The system of claim 11, wherein
   the user interface screen shows a plurality of installation patterns for allowing a user to select an arbitrary installation pattern, and
   the user interface process generates, in response to detecting a third user input indicating a selection of the arbitrary installation pattern, generates the user interface screen showing the image display area including the image of the conveyor and the code reader drawn based on the first user input and the third user input.

19. The system of claim 18, wherein the plurality of installation patterns includes a first installation pattern for reading a single surface of a workpiece and a second installation pattern for reading a first plurality of surfaces of the workpiece.

20. The system of claim 19, wherein the plurality of installation patterns further includes a third installation pattern for reading a second plurality of surfaces of the workpiece, the second plurality of surfaces being greater than the first plurality of surfaces.

* * * * *